(12) United States Patent
Satake

(10) Patent No.: US 8,774,786 B2
(45) Date of Patent: Jul. 8, 2014

(54) MOBILE PHONE TERMINAL AND SERVER

(75) Inventor: Masaomi Satake, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1314 days.

(21) Appl. No.: 12/298,741

(22) PCT Filed: Apr. 26, 2007

(86) PCT No.: PCT/JP2007/059123
§ 371 (c)(1),
(2), (4) Date: Mar. 10, 2009

(87) PCT Pub. No.: WO2007/126028
PCT Pub. Date: Nov. 8, 2007

(65) Prior Publication Data
US 2009/0215463 A1    Aug. 27, 2009

(30) Foreign Application Priority Data
Apr. 27, 2006  (JP) .................................. 2006-124524

(51) Int. Cl.
*H04M 3/42*    (2006.01)
(52) U.S. Cl.
USPC ........................ 455/416; 455/519; 379/202.01
(58) Field of Classification Search
USPC ............. 455/517–519, 416, 445; 379/202.01, 379/203.01, 204.01, 205.01
See application file for complete search history.

(56) References Cited

U.S. PATENT DOCUMENTS

| 5,369,783 A | * | 11/1994 | Childress et al. | ................ 455/17 |
| 5,530,914 A | * | 6/1996 | McPheters | .................... 455/518 |
| 6,873,854 B2 | | 3/2005 | Crockett et al. | |
| 6,895,254 B2 | * | 5/2005 | Dorenbosch | .................... 455/518 |
| 7,231,206 B2 | * | 6/2007 | Cudak et al. | ................ 455/414.2 |
| 7,600,022 B2 | * | 10/2009 | Takamine | ....................... 709/226 |
| 7,894,842 B2 | * | 2/2011 | Jagoe et al. | .................... 455/519 |

(Continued)

FOREIGN PATENT DOCUMENTS

| CN | 1643950 A | 7/2005 |
| JP | 04-290361 | 10/1992 |

(Continued)

OTHER PUBLICATIONS

J. Rosenberg et al., "SIP: Session Initiation Protocol", RFC 3261, Jun. 2002, pp. 1-240.

(Continued)

*Primary Examiner* — Sharad Rampuria
(74) *Attorney, Agent, or Firm* — DLA Piper LLP (US)

(57) ABSTRACT

A server according to the present invention includes: an SIP information receiver 201 configured to receive new calling information that requests start of a group call; a group call processor 202 and a group call management DB 203 configured to manage halfway participation in which a mobile phone terminal not participating in the group call participates in the group call, and halfway withdrawal in which a mobile phone terminal participating in the group call withdraws from the group call; and an SMS transmission requesting unit 204 configured to transmit a participating terminal change notification to a mobile phone terminal that is specified as a calling destination of the group call and has not participated in the group call when halfway participation or halfway withdrawal is detected, the participating terminal change notification including information indicating that the halfway participation or the halfway withdrawal has occurred, and terminal identification information that identifies a mobile phone terminal that participates halfway or withdraws halfway.

3 Claims, 18 Drawing Sheets

(56) References Cited

U.S. PATENT DOCUMENTS

| | | | |
|---|---|---|---|
| 8,107,948 B2 * | 1/2012 | Nishigai | 455/422.1 |
| 8,565,749 B2 * | 10/2013 | Satake | 455/422.1 |
| 2003/0153339 A1 * | 8/2003 | Crockett et al. | 455/518 |
| 2007/0127670 A1 * | 6/2007 | Morishima et al. | 379/202.01 |
| 2009/0233639 A1 * | 9/2009 | Watson et al. | 455/519 |

FOREIGN PATENT DOCUMENTS

| | | | |
|---|---|---|---|
| JP | 2003298751 A | | 10/2003 |
| JP | 2004-274128 | | 9/2004 |
| JP | 2005-535156 | | 11/2005 |
| JP | 2007-025946 | | 2/2007 |
| WO | 03069928 A1 | | 8/2003 |
| WO | 2006003709 A1 | | 1/2006 |

OTHER PUBLICATIONS

Japanese language office action dated Aug. 10, 2010 and its English language translation for corresponding Japanese application 2006124524 lists the references above.

Chinese language office action dated Feb. 16, 2011 and its English language translation for corresponding Chinese application 200780015302.4 cites the relevance of foreign patent documents listed above.

Japanese language office action and its English language translation for corresponding Japanese application 2006124524 lists the references above.

Japanese language office action dated Jan. 18, 2011 and its English language translation for corresponding Japanese application 2006124524 cites the foreign patent documents above.

Notice of Preliminary Rejection for Korean application No. 10-2008-7026482.

* cited by examiner

| PARTICIPATING MEMBER HISTORY | INITIAL SPECIFIED MOBILE STATION LIST | PARTICIPATION CONDITION | INHIBIT FLAG |
|---|---|---|---|
| MOBILE STATION10a | ○(ORIGINATING MOBILE STATION) | CALLING | 0 (valid) |
| MOBILE STATION10b | ○ | CALLING | |
| MOBILE STATION10c | ○ | CALLING | |
| MOBILE STATION10d | ○ | NOT RESPONDED | |

(b)

| PARTICIPATING MEMBER HISTORY | INITIAL SPECIFIED MOBILE STATION LIST | PARTICIPATION CONDITION | INHIBIT FLAG |
|---|---|---|---|
| MOBILE STATION10a | ○(ORIGINATING MOBILE STATION) | CALLING | 0 (valid) |
| MOBILE STATION10b | ○ | DISCONNECTED | |
| MOBILE STATION10c | ○ | CALLING | |
| MOBILE STATION10d | ○ | NOT RESPONDED | |

(c)

| PARTICIPATING MEMBER HISTORY | INITIAL SPECIFIED MOBILE STATION LIST | PARTICIPATION CONDITION | INHIBIT FLAG |
|---|---|---|---|
| MOBILE STATION10a | ○(ORIGINATING MOBILE STATION) | CALLING | 0 (valid) |
| MOBILE STATION10b | ○ | DISCONNECTED | |
| MOBILE STATION10c | ○ | CALLING | |
| MOBILE STATION10d | ○ | NOT RESPONDED | |
| MOBILE STATION10e | × | CALLING | |

(d)

| PARTICIPATING MEMBER HISTORY | INITIAL SPECIFIED MOBILE STATION LIST | PARTICIPATION CONDITION | INHIBIT FLAG |
|---|---|---|---|
| MOBILE STATION10a | ○(ORIGINATING MOBILE STATION) | DISCONNECTED | 1 (invalid) |
| MOBILE STATION10b | ○ | DISCONNECTED | |
| MOBILE STATION10c | ○ | DISCONNECTED | |
| MOBILE STATION10d | ○ | NOT RESPONDED | |
| MOBILE STATION10e | × | DISCONNECTED | |

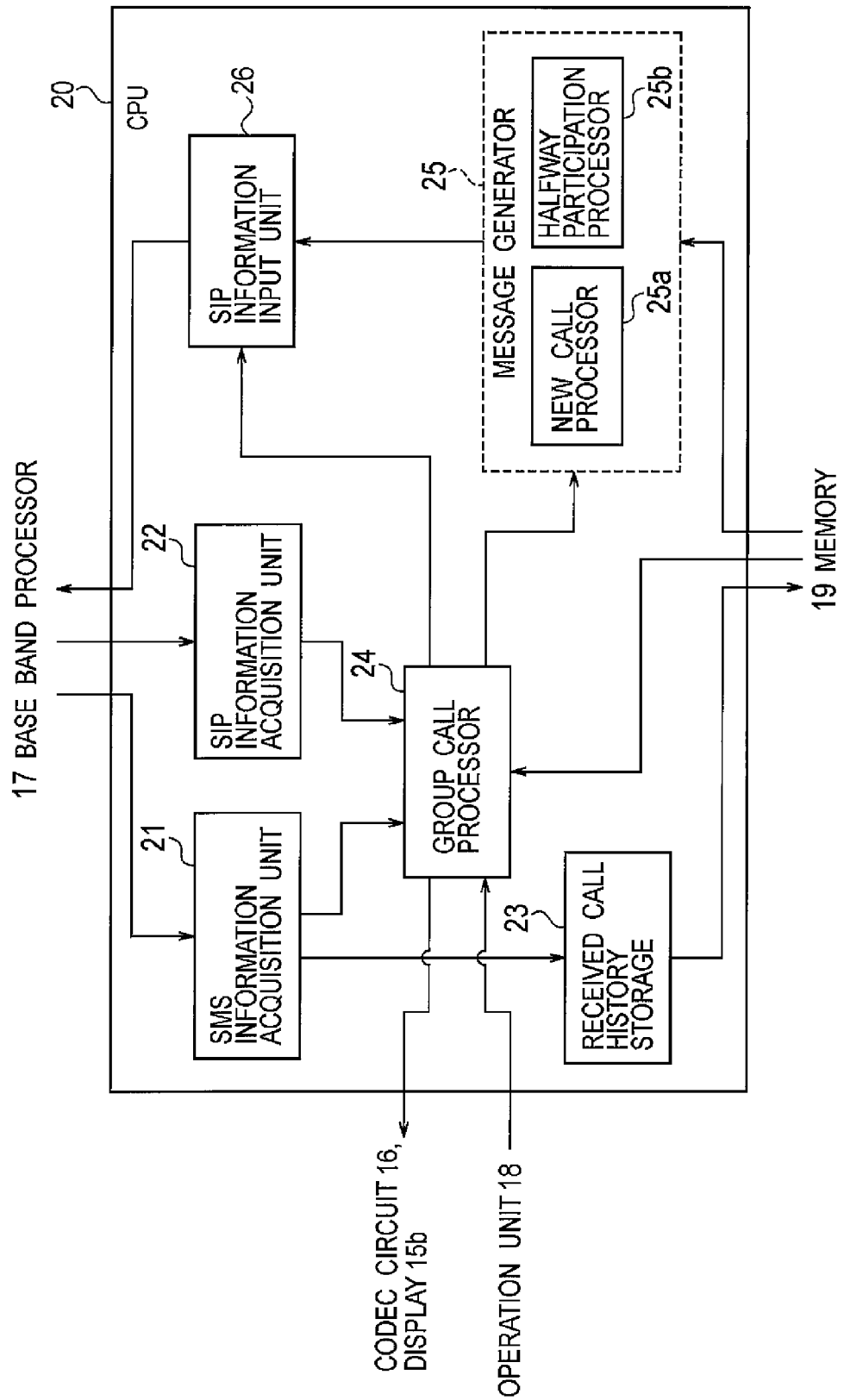

| PARTICIPATING MEMBER HISTORY | INITIAL SPECIFIED MOBILE STATION LIST | PARTICIPATION CONDITION | CALL STATE |
|---|---|---|---|
| MOBILE STATION10a | ○(ORIGINATING MOBILE STATION) | CALLING | CALLING |
| MOBILE STATION10b | ○ | CALLING | |
| MOBILE STATION10c | ○ | CALLING | |
| MOBILE STATION10d | ○ | NOT RESPONDED | |

(b)

| PARTICIPATING MEMBER HISTORY | INITIAL SPECIFIED MOBILE STATION LIST | PARTICIPATION CONDITION | CALL STATE |
|---|---|---|---|
| MOBILE STATION10a | ○(ORIGINATING MOBILE STATION) | CALLING | CALLING |
| MOBILE STATION10b | ○ | DISCONNECTED | |
| MOBILE STATION10c | ○ | CALLING | |
| MOBILE STATION10d | ○ | NOT RESPONDED | |

(c)

| PARTICIPATING MEMBER HISTORY | INITIAL SPECIFIED MOBILE STATION LIST | PARTICIPATION CONDITION | CALL STATE |
|---|---|---|---|
| MOBILE STATION10a | ○(ORIGINATING MOBILE STATION) | CALLING | CALLING |
| MOBILE STATION10b | ○ | DISCONNECTED | |
| MOBILE STATION10c | ○ | CALLING | |
| MOBILE STATION10d | ○ | NOT RESPONDED | |
| MOBILE STATION10e | × | CALLING | |

(d)

| PARTICIPATING MEMBER HISTORY | INITIAL SPECIFIED MOBILE STATION LIST | PARTICIPATION CONDITION | CALL STATE |
|---|---|---|---|
| MOBILE STATION10a | ○(ORIGINATING MOBILE STATION) | DISCONNECTED | DIS-CONNECTED |
| MOBILE STATION10b | ○ | DISCONNECTED | |
| MOBILE STATION10c | ○ | DISCONNECTED | |
| MOBILE STATION10d | ○ | NOT RESPONDED | |
| MOBILE STATION10e | × | DISCONNECTED | |

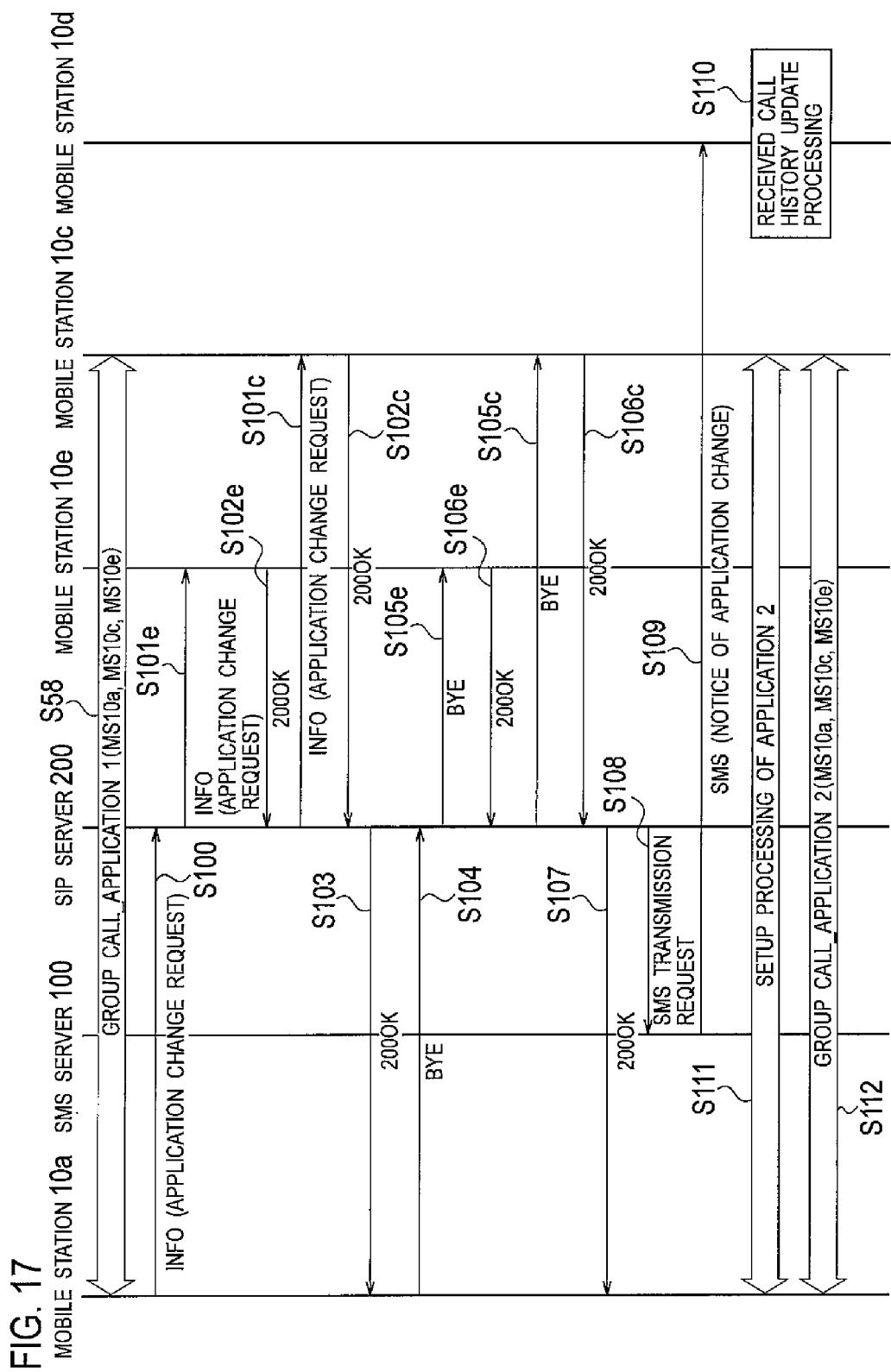

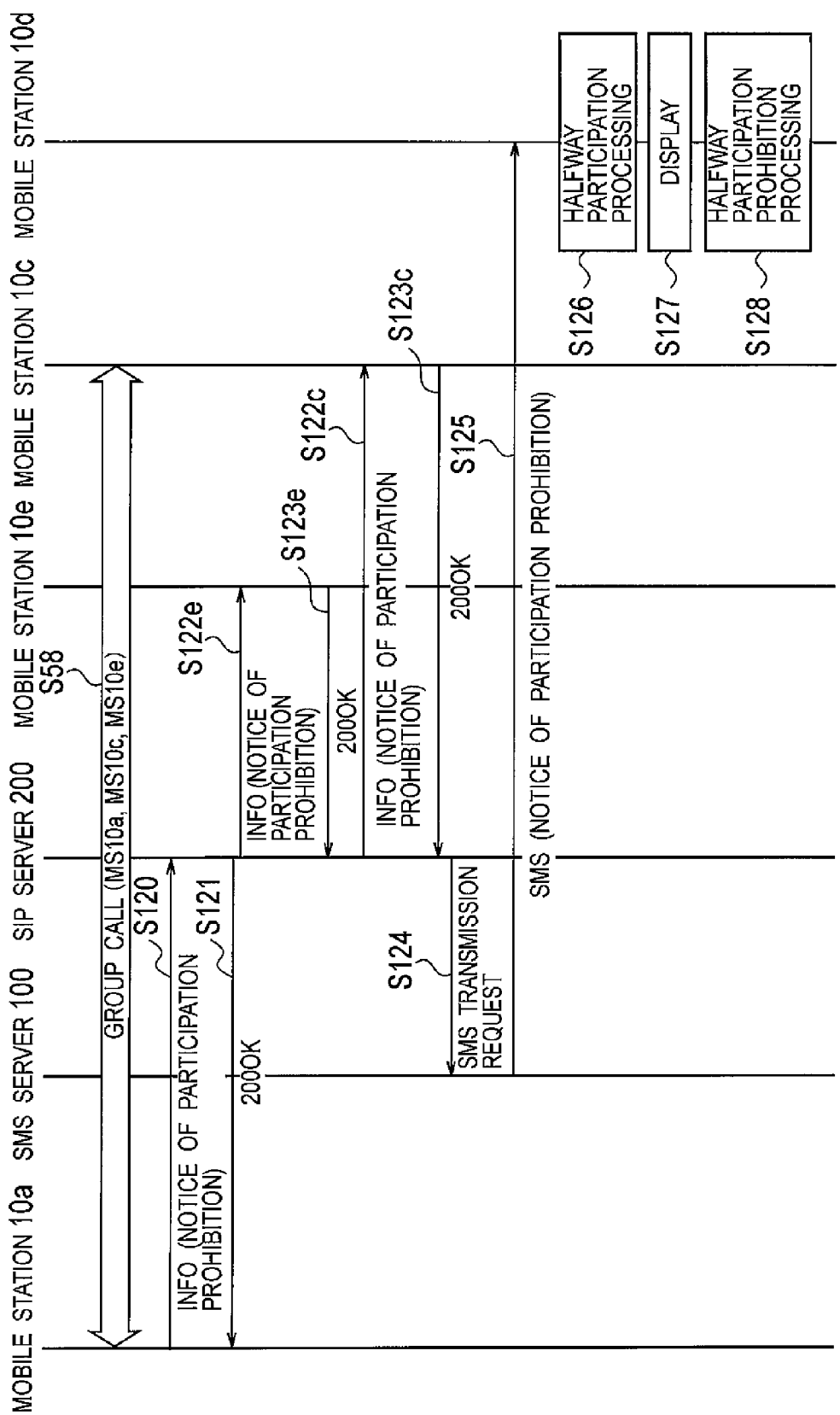

MOBILE PHONE TERMINAL AND SERVER

TECHNICAL FIELD

The present invention relates to a mobile phone terminal and a server connectable with a group call system that performs a group call in which a phone call among a plurality of mobile phone terminals is performed.

BACKGROUND ART

Conventionally, communication systems are known in which an originating mobile station and a plurality of mobile stations specified by the originating mobile station (hereinafter, referred to as specified mobile stations) form a group to perform a group call. The group call includes PTT (Push-To-Talk) in which authority to transmit a voice signal, i.e., authority for a user to speak (right to speak), is assigned only to one mobile station that participates in the group call.

Specifically, the group call is performed through a packet switching NW, and is performed by use of SIP (Session Initiation Protocol). The group call is started when each mobile station included in the group logs in to (registers in) an SIP server connected to the packet switching NW (for example, non-patent literature 1).

Thus, the group call cannot be started without a login of each mobile station to the SIP server. Therefore, when the originating mobile station attempts to start the group call, the specified mobile station needs to log in to the SIP server.

Accordingly, for the specified mobile station to log in to the SIP server, information that requests the login to the SIP server (SMS (Short Message Service) information) is transmitted to the specified mobile station through a line switching NW different from the packet switching NW.

Specifically, when receiving information (INVITE) that requests start of the group call from the originating mobile station, the SIP server transmits a request for transmitting the SMS information that requests a login to the SIP server, to an SMS server connected with the line switching NW. Subsequently, the SMS server transmits to each specified mobile station the SMS information that requests a login to the SIP server.

On the other hand, another group call is also known in which a mobile station that has not participated in a group call (hereinafter, referred to as non-participating mobile station) can be invited to participate in the group call halfway. The non-participating mobile station indicates a specified mobile station that does not respond a call from the originating mobile station although specified by the originating mobile station, or a mobile station not specified by the originating mobile station, and the like.

Specifically, in such a group call, the originating mobile station transmits, to the SIP server, information for inviting the non-participating mobile station to participate in the group call halfway. The SIP server transmits to the SMS server a request for transmitting the SMS information that requests a login to the SIP server. Subsequently, the SMS server transmits the SMS information that requests a login to the SIP server to the non-participating mobile station.
Non-patent literature 1: "SIP: Session Initiation Protocol," RFC3261

DISCLOSURE OF THE INVENTION

However, in the group call mentioned above, it has been difficult for the non-participating mobile station to participate in a desired group call halfway by oneself without an invitation from the originating mobile station.

Particularly, when a user does not notice a call from the originating mobile station, it is difficult for the user to participate in the desired group call halfway. Thus, such difficulties of halfway participation remarkably reduce convenience for the user.

Then, the present invention was made in order to solve the problem mentioned above. An object of the present invention is to provide a mobile phone terminal and a server that allow easy halfway participation in a desired group call without an invitation from a mobile station (mobile phone terminal) included in a group that is performing a group call.

One aspect of the present invention is summarized in that a server that manages a group call where a phone call among a plurality of mobile phone terminals is performed includes: a new calling information receiver (SIP information receiver 201) configured to receive new calling information that requests start of the group call; a management unit (group call processor 202, group call management DB 203) configured to manage halfway participation indicating that a mobile phone terminal not participating in the group call participates in the group call, and halfway withdrawal indicating that a mobile phone terminal participating in the group call withdraws from the group call; and a transmitter (SMS transmission requesting unit 204, SMS information transmission and reception unit 103) configured to transmit a participating terminal change notification to a mobile phone terminal that is specified as a calling destination of the group call and has not participated in the group call, when the management unit detects the halfway participation or the halfway withdrawal, the participating terminal change notification including information indicating that the halfway participation or the halfway withdrawal has occurred, and terminal identification information identifying a mobile phone terminal that participates halfway or withdraws halfway.

According to this aspect, the server transmits the participating terminal change notification to the mobile phone terminal not participating in the group call, the participating terminal change notification including the terminal identification information identifying a mobile phone terminal that participates halfway or withdraws halfway. That is, the mobile phone terminal can grasp mobile phone terminals participating in the group call.

Here, since the mobile phone terminal cannot simultaneously participate in a plurality of group calls, a desired group call is specified by the terminal identification information identifying the mobile phone terminals that are participating in the group call.

As a result, since the mobile phone terminal can specify the desired group call, the mobile phone terminal can easily participate in the desired group call halfway without an invitation from the mobile station (mobile phone terminal) included in the group performing the group call.

One aspect of the present invention is summarized in that a mobile phone terminal connectable with a group call system that performs a group call in which a phone call among a plurality of mobile phone terminals is performed includes: a receiver (SMS information acquisition unit 21) configured to receive new received call information that includes group identification information identifying the group call and that requests participation to the group call; a storage unit (memory 19) configured to store as a received call history the group call corresponding to the new received call information received by the receiver, while associating the group call with the group identification information included in the new received call information and terminal identification information identifying a mobile phone terminal specified as a calling destination of the group call; and a received call history updating unit (received call history storage 23) configured to update the terminal identification information stored as the received call history on the basis of a participating terminal change notification when receiving the participating terminal change notification, the participating terminal change notification including: information indicating that halfway participation or halfway withdrawal has occurred, the halfway participation indicating that a mobile phone terminal not participating in the group call participates in the group call, the halfway withdrawal indicating that a mobile phone terminal participating in the group call withdraws from the group call; terminal identification information identifying a mobile phone terminal that participates halfway or withdraws halfway; and the group identification information.

According to the present invention, it is possible to provide the provision of a mobile phone terminal and a server that allow easy halfway participation in a desired group call without an invitation from a mobile phone terminal included in a group that is performing the group call.

BRIEF DESCRIPTION OF THE DRAWINGS

FIG. 3 is a drawing showing an example of a received call history stored in a memory according to the first embodiment of the present invention.

FIG. 4 is a block diagram showing a configuration of a CPU according to the first embodiment of the present invention.

FIG. 6 is drawing showing an example of management information stored in a group call management DB according to the first embodiment of the present invention.

FIG. 17 is a sequence diagram showing operation of a communication system according to a third embodiment of the present invention.

FIG. 18 is a sequence diagram showing operation of a communication system according to a fourth embodiment of the present invention.

BEST MODE FOR CARRYING OUT THE INVENTION

First Embodiment (Configuration of a Communication System)

Figure 1:
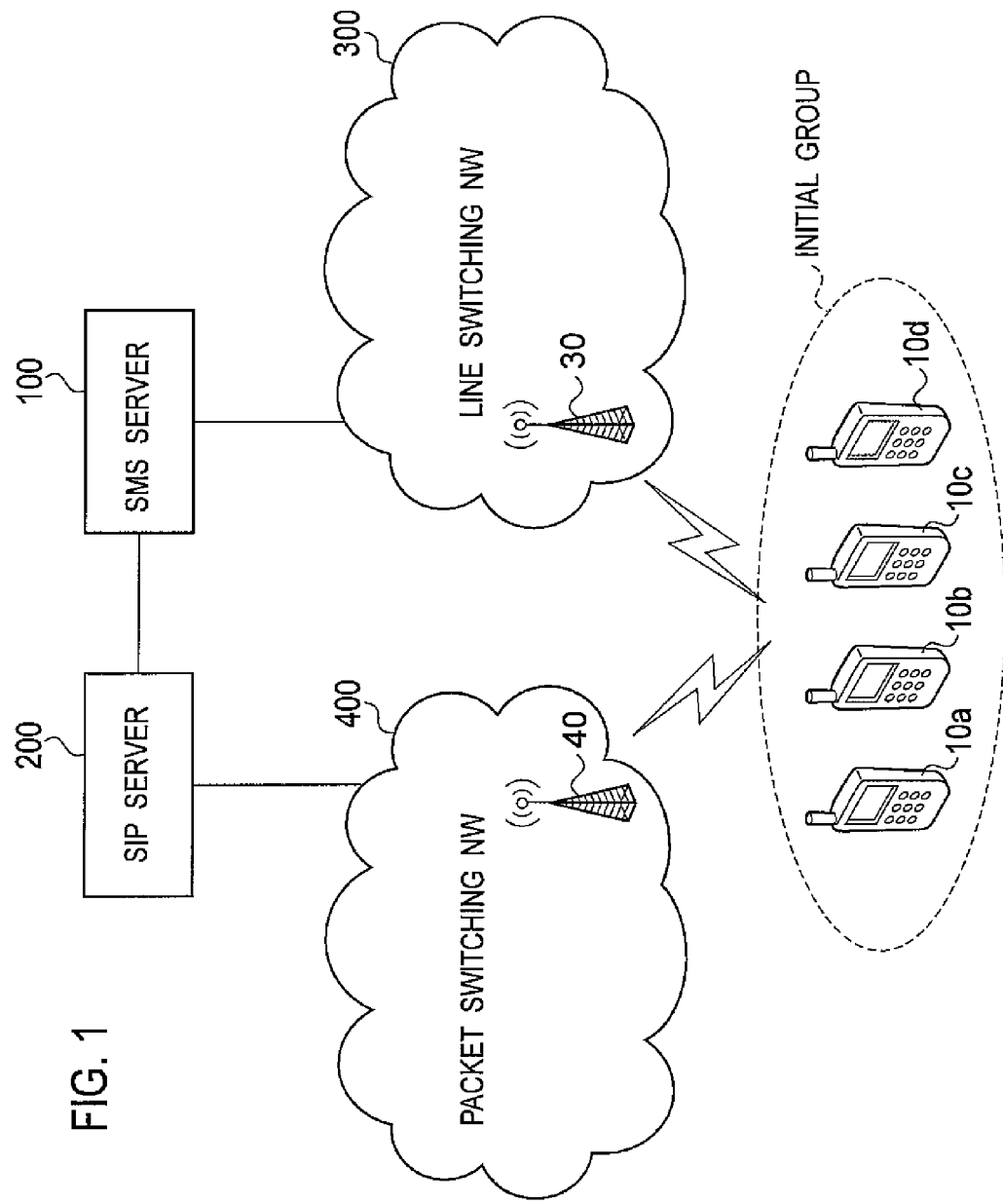
FIG. 1 is a drawing showing a configuration of a communication system according to a first embodiment of the present invention.

Hereinafter, a communication system according to a first embodiment of the present invention will be described with reference to the drawings. FIG. 1 is a drawing showing a configuration of the communication system according to the first embodiment of the present invention.

As shown in FIG. 1, the communication system has a line switching NW 300 including a base station 30$r$ a packet switching NW 400 including a base station 40, an SMS server 100 connected to the line switching NW 300, and an SIP server 200 connected to the packet switching NW 400. The SMS server 100 and the SIP server 200 are connected to each other.

The base station 30 and the base station 40 are different from each other in description of the first embodiment, but not limited to this. Specifically, one base station included in both the line switching NW 300 and the packet switching NW 400 may have functions that the base station 30 and the base station 40 have.

A plurality of mobile stations 10 (mobile station 10$a$ to mobile station 10$d$) are mobile phone terminals connectable with the communication system. Specifically, each mobile station 10 can be connected with the base station 30 included in the line switching NW 300 and can be connected with the base station 40 included in the packet switching NW 400.

The line switching NW 300 is a network where communication is performed by line switching (for example, 1× network used in cdma2000), and a network where address registration of the mobile station 10 is unnecessary when the mobile station 10 communicates. On the other hand, the packet switching NW 400 is a network where communication is performed by packet switching (for example, EV-DO (Evolution Data Optimized) network used in cdma2000), and a network where address registration of the mobile station 10 is necessary when the mobile station 10 communicates.

In the packet switching NW 400, a group call is performed by forming a group as an initial group. The group includes one mobile station 10 (originating mobile station) and another mobile station 10 that responds a call from the originating mobile station among the other mobile stations 10 (specified mobile stations) specified by the one mobile station 10.

In the description of the first embodiment, the originating mobile station is the mobile station 10$a$ and the specified mobile stations are the mobile station 10$b$ to the mobile station 10$d$.

In the group call according to the first embodiment, the mobile station 10 that is participating in the group call can also invite another mobile station 10 not included in the specified mobile station to participate in the group call.

Here, the group call includes the PTT (Push-To-Talk) that transmits and receives only voice signals and the IP-TV that transmits and receives voice signals and image signals.

(Configuration of a Mobile Station)

Figure 2:
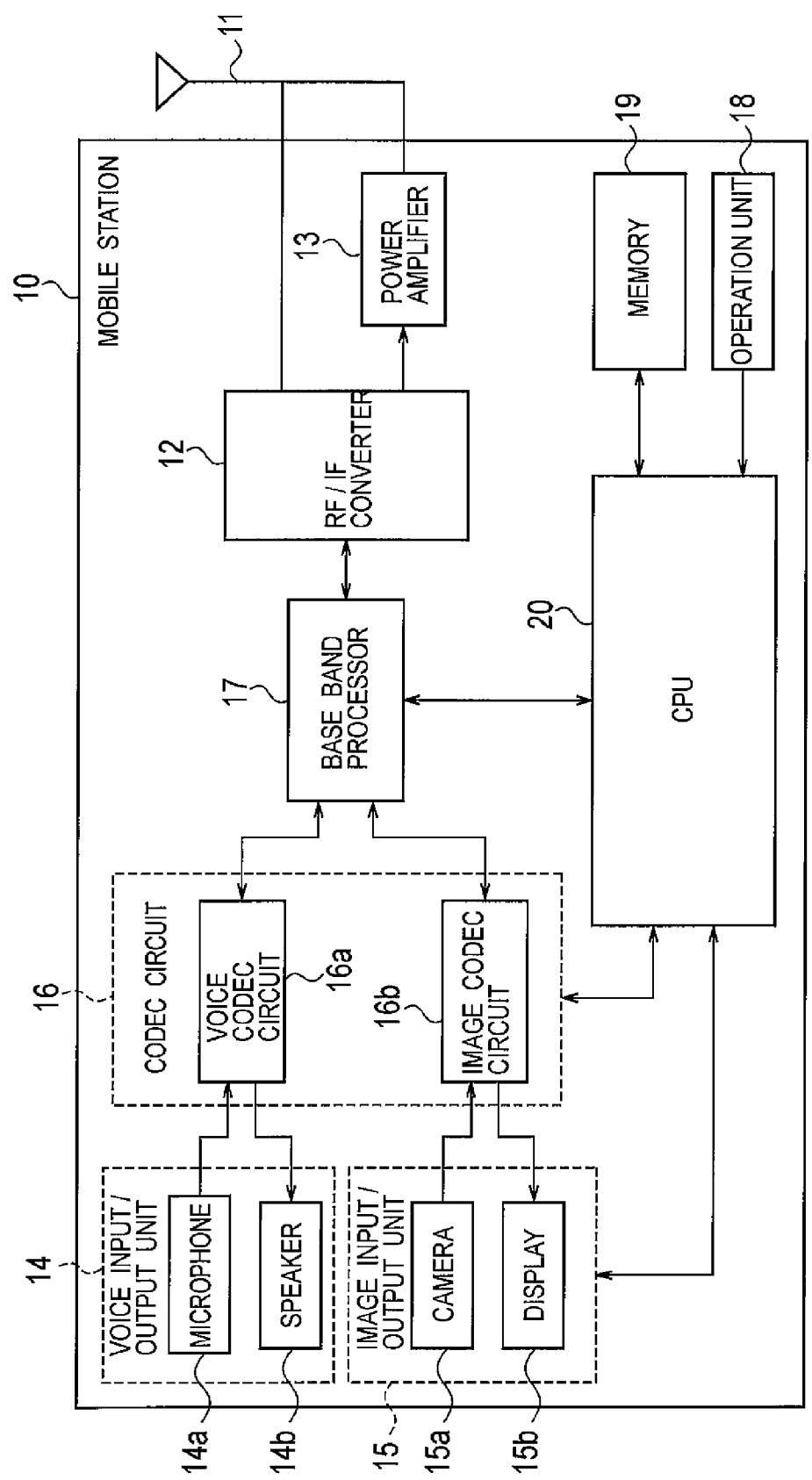
FIG. 2 is a block diagram showing a configuration of a mobile station according to the first embodiment of the present invention.

Hereinafter, a configuration of a mobile station according to the first embodiment of the present invention will be described with reference to the drawings. FIG. 2 is a block diagram showing a configuration of the mobile station 10 according to the first embodiment of the present invention. Since the mobile station 10a to the mobile station 10d have a similar configuration, these stations are referred to as the mobile station 10 in the descriptions hereinafter.

As shown in FIG. 2, the mobile station 10 has an antenna 11, an RF/IF converter 12, a power amplifier 13, a voice input/output unit 14, an image input/output unit 15, a codec circuit 16, a base band processor 17, an operation unit 18, a memory 19, and a CPU 20.

The antenna 11 receives a signal (received signal) transmitted by the base station 30 included in the line switching NW 300, and a signal (received signal) transmitted by the base station 40 included in the packet switching NW 400. The antenna 11 transmits a signal (transmission signal) to the base station 30 included in the line switching NW 300 and to the base station 40 included in the packet switching NW 400.

The RF/IF converter 12 converts a frequency (RF (Radio Frequency)) of the received signal received by the antenna 11 into a frequency (IF (Intermediate Frequency)) treated by the base band processor 17. Moreover, the RF/IF converter 12 converts a frequency (intermediate frequency (IF)) of the transmission signal acquired from the base band processor 17 into a frequency (radio frequency (RF)) used in radio communications. The RF/IF converter 12 inputs the transmission signal converted into the radio frequency (RF) to the power amplifier 13.

The power amplifier 13 amplifies the transmission signal acquired from the RF/IF converter 12 to input the amplified transmission signal into the antenna 11.

The voice input/output unit 14 has a microphone 14a that collects a voice, and a speaker 14b that outputs the voice. The microphone 14a inputs a voice signal into the codec circuit 16 on the basis of the collected voice. The speaker 14b outputs the voice on the basis of the voice signal acquired from the codec circuit 16.

The image input/output unit 15 has a camera 15a that shoots a subject to be shot, and a display 15b that displays characters, images, etc. The camera 15a inputs an image signal into the codec circuit 16 on the basis of the shot image (static image and dynamic image). The display 15b displays the image on the basis of the image signal acquired from the codec circuit 16. The display 15b also displays characters, etc. inputted by use of the operation unit 18.

The codec circuit 16 has a voice codec circuit 16a and an image codec circuit 16b. The voice codec circuit 16a encodes and decodes the voice signal in accordance with a predetermined coding mode (for example, G. 729 specified in the ITU-T). The image codec circuit 16b encodes and decodes the image signal in accordance with a predetermined coding mode (for example, MPEG (Moving Picture coding Experts Group)-4, etc.)

The voice codec circuit 16a encodes the voice signal acquired from the voice input/output unit 14, and decodes the voice signal acquired from the base band processor 17. The image codec circuit 16b encodes the image signal acquired from the image input/output unit 15, and decodes the image signal acquired from the base band processor 17.

The base band processor 17 modulates the transmission signal, or demodulates the received signal in accordance with a predetermined modulation technique such as (BPSK (Binary Phase Shift Keying) and QPSK (Quadrature Phase Shift Keying), etc. Specifically, the base band processor 17 modulates base band signals such as the voice signal and the image signal acquired from the codec circuit 16 to input the modulated base band signals (transmission signals) into the RF/IF converter 12. The base band processor 17 demodulates the received signal acquired from the RF/IF converter 12 to input the demodulated received signal (base band signal) into the codec circuit 16.

The base band processor 17 modulates information (SMS information and SIP information) generated by the CPU 20 to input the modulated information (transmission signal) into the RF/IF converter 12. The base band processor 17 demodulates the received signal acquired from the RF/IF converter 12 to input the demodulated received signal (SMS information and SIP information) into the CPU 20.

The SMS information is the information transmitted and received through the line switching NW 300. The SIP information is the information transmitted and received through the packet switching NW 400.

The operation unit 18 is a group of keys formed of input keys for inputting characters, numbers, etc.; a calling key for starting the group call; and a responding key for responding a received call (call), etc. When each key is pressed down, the operation unit 18 inputs an input signal corresponding to the pressed key into the CPU 20.

The memory 19 stores a program for controlling operation of the mobile station 10, and various data as a received call history, an address book, etc. The memory 19 is formed of, for example, a flash memory that is a nonvolatile semiconductor memory, or an SRAM (Static Random Access Memory) that is a volatile semiconductor memory.

Specifically, the memory 19 stores information shown as the received call history in FIG. 3. FIG. 3 is a drawing showing an example of the received call history stored in the memory 19 according to the first embodiment of the present invention.

As shown in FIG. 3 (a) to FIG. 3 (d), in the received call history, a participating member history, an initial specified mobile station list, a participation condition, and an inhibit flag are corresponded to each other.

The participating member history is formed of initial specified mobile stations and a mobile station 10 that participates in the group call halfway. The participating member history also includes a mobile station 10 that is already withdrawn from the group call, and a mobile station 10 that has not responded although specified as the specified mobile station. As shown in FIG. 3 (a) to FIG. 3 (d), a mobile station 10 is added to the participating member history as the mobile station 10 participates in the group call halfway.

Apparently, while the participating member history column includes information of names of mobile stations 10 in FIG. 3 (a) to FIG. 3 (d), the information on the participating member history column may be mobile station identification information that identifies each of the mobile stations 10 (for example, telephone number).

The initial specified mobile station list includes information ("○" and "x") that shows whether or not the mobile station 10 stored in the participating member history is the initial specified mobile station. In the initial specified mobile station list column, mobile station identification information that identifies the initial specified mobile station may be stored. Information for identifying an originating mobile station (for example, "originating mobile station") is also stored in the initial specified mobile station list column.

The participation condition is information that shows whether or not the mobile station 10 is participating in the group call. When the mobile station 10 is participating in the group call, "calling" is stored as participating information. When the mobile station 10 withdraws from the group call, "disconnected" is stored as the participating information. When the mobile station 10 has not responded, "not responded" is stored as the participating information.

Here, "disconnected" and "not responded" are the information indicating that the mobile station 10 has not participated in the group call, and below, the mobile station 10 having the received call history (participation condition) of "not responded" or "disconnected" is referred to as a non-participating mobile station.

As described later, the participation condition is updated by the SMS information (SMS (notice of participant), the SMS (notice of updated participant), and the SMS (notice of participant withdrawal)) received through the line switching NW 300 from the SMS server 100.

The inhibit flag is a flag indicating whether or not halfway participation in the group call is possible. Specifically, when the halfway participation in the group call is possible, the inhibit flag is set to "valid (0)." On the other hand, when the halfway participation in the group call is impossible (when the group call is completed), the inhibit flag is set to "invalid (1)."

In the present embodiment, when all the information on the participation condition column changes to "disconnected" or "not responded," the inhibit flag is updated from "valid (0)" to "invalid (1)." Alternatively, when the information on the participation condition column corresponding to the originating mobile station changes "disconnected," the inhibit flag may be updated from "valid (0)" to "invalid (1)."

The CPU 20 controls operation of the mobile station 10 (image input/output unit 15, codec circuit 16, base band processor 17, etc.) in accordance with the program stored in the memory 19.

Hereinafter, a configuration of the CPU according to the first embodiment of the present invention will be described with reference to the drawing. FIG. 4 is a block diagram showing the configuration of the CPU 20 according to the first embodiment of the present invention.

As shown in FIG. 4, the CPU 20 has an SMS information acquisition unit 21, an SIP information acquisition unit 22, a received call history storage 23, a group call processor 24, a message generator 25, and an SIP information input unit 26.

The SMS information acquisition unit 21 acquires, from the base band processor 17, the SMS information received from the SMS server 100 through the line switching NW 300, and inputs the acquired SMS information into the group call processor 24.

Here, the SMS information is, for example, an address registration request (SMS (registration request)) that requests address registration in the SIP server 200 connected to the packet switching NW 400. Specifically, the address registration request (SMS (registration request)) includes mobile station identification information that identifies each of the mobile 15 stations 10 (mobile station 10a to mobile station 10d in the first embodiment) included in the initial specified mobile station list.

Additionally, the SMS information is the SMS including the mobile station identification information that identifies the mobile station 10 that participates in the group call (notice of participant), the SMS including the mobile station identification information that identifies the mobile station 10 that participates in the group call halfway (notice of updated participant), the SMS indicating that the mobile station 10 has withdrawn from the group call (notice of participant withdrawal), etc.

Alternatively, as shown in a third embodiment described later, the SMS information may be an SMS (notice of application change) indicating that an application used in the group call is changed. Furthermore, as shown in a fourth embodiment described later, the SMS information may be an SMS (notice of participation prohibition) indicating that halfway participation in the group call is prohibited.

The SIP information acquisition unit 22 acquires, from the base band processor 17, the SIP information received from the SIP server 200 through the packet switching NW 400, and inputs the acquired SIP information into the group call processor 24.

Here, the SIP information is an INVITE (new) that requests other mobile station 10 to participate in the group call, an INVITE (halfway participation) that requests halfway participation in the group call, INFO (notice of participant) indicating participation of the mobile station 10 in a new group call, INFO (notice of updated participant) indicating update of the mobile stations 10 that participate in the group call, etc. Moreover, the SIP information is various messages (100Trying, 180Ringing, 200OK, ACK, BYE, etc.) used in the SIP (Session Initiation Protocol).

Alternatively, as shown in the third embodiment described later, the SIP information may be INFO (application change request) that requests change of an application used in the group call, or as shown in the fourth embodiment described later, the SIP information may be INFO (notice of participation prohibition) indicating the mobile station 10 that is prohibited from participating in the group call halfway.

The received call history storage 23 stores the received call history in the memory 19 in response to the address registration request (SMS (registration request)), etc. acquired from the SMS information acquisition unit 21. Specifically, the received call history storage 23 stores, in the memory 19, the mobile station identification information included in the address registration request (SMS (registration request)) as the initial specified mobile station in the received call history (participating member history).

Additionally, on the basis of the SMS (notice of participant), the received call history storage 23 updates the received call history (participation condition) stored in the memory 19 to "calling," the received call history corresponding to the mobile station identification information that identifies each mobile station 10.

Furthermore, on the basis of the SMS (notice of updated participant), the received call history storage 23 adds, to the received call history (participating member history) stored in the memory 19, the mobile station identification information identifying the mobile station 10 that participates in the group call halfway. Simultaneously, the received call history storage 23 updates the received call history (participation condition).

On the basis of the SMS (notice of participant withdrawal), the received call history storage 23 updates the received call history (participation condition) stored in the memory 19 from "calling" to "disconnected," the received call history (participation condition) corresponding to the mobile station identification information that identifies the mobile station 10 that is withdrawn from the group call.

At this point, in updating the received call history stored in the memory 19 on the basis of the SMS (notice of participant), the SMS (notice of updated participant), and the SMS (notice of participant withdrawal), the received call history storage 23 specifies the received call history to be updated in accordance with the group identification information that identifies the group call. The group identification information is time when the group call starts, the mobile station identification information that identifies the originating mobile station, the initial specified mobile station list, etc., and is included in the SMS (notice of participant), the SMS (notice of updated participant), and the SMS (notice of participant withdrawal).

Moreover, the received call history storage 23 stores in the memory 19, as the received call history, the inhibit flag indicating whether or not halfway participation in the group call is possible. Specifically, the received call history storage 23 stores "0 (valid)" as an initial value of the inhibit flag, "0 (valid)" indicating that halfway participation in the group call is possible. On the other hand, the received call history storage 23 updates the inhibit flag to "1 (invalid)" indicating that halfway participation in the group call is impossible when all the received call histories (participation condition) stored in the memory 19 become "disconnected" or "not responded."

The group call processor 24 performs processing concerning the group call in accordance with the SIP (Session Initiation Protocol). For example, in response to the input signal acquired from the operation unit 18, the group call processor 24 performs processing to start a new group call, processing to respond a call from other mobile station 10, processing to participate in the group call halfway, processing to end the group call, etc.

Additionally, in response to the address registration request (SMS (registration request)) acquired from the SMS information acquisition unit 21, the group call processor 24 performs processing (registration processing) to register the address in the SIP server 200.

Furthermore, in response to the SIP information acquired from the SIP information acquisition unit 22, the group call processor 24 generates the SIP information to input the generated SIP information into the SIP information input unit 26. When starting a new group call or participating in the group call halfway, the group call processor 24 inputs a generating request requesting generation of the SIP information into the message generator 25.

The message generator 25 has a new call processor 25a and a halfway participation processor 25b. The SIP information generated by the new call processor 25a and that generated by the halfway participation processor 25b are inputted into the SIP information input unit 26.

In response to the generating request acquired from the group call processor 24 when starting a new group call, the new call group processor 25a generates the SIP information, i.e., the INVITE (new) that requests other mobile stations 10 to participate in the group call. Specifically, the new call processor 25a reads from the memory 19 the mobile station identification information that identifies each specified mobile station 10 out of the address book stored in the memory 19, and generates the INVITE (new) including the read mobile station identification information. Apparently, the operation unit 18 may input the mobile station identification information.

On the other hand, in response to the generating request acquired from the group call processor 24 when halfway participation in the group call occurs, the participating processor 25b generates the SIP information, i.e., the INVITE (halfway participation) that requests halfway participation in the group call. Specifically, the participating processor 25b generates the INVITE (halfway participation) that requests halfway participation in the group call specified by a user out of the received call history stored in the memory 19.

Specifically, the INVITE (halfway participation) includes the mobile station identification information that identifies the mobile station 10 that is participating in the group call at present. That is, the INVITE (halfway participation) includes the mobile station identification information having the received call history (participation condition) of "calling" stored in the memory 19.

The INVITE (halfway participation) may include the mobile station identification information that identifies the mobile station 10 included in the initial specified mobile station. That is, the INVITE (halfway participation) may include the identification information of the mobile station stored as an initial specified mobile station in the received call history (participating member history) stored in the memory 19 (mobile station identification information where "○" is stored in the initial specified mobile station list column in FIG. 3).

The SIP information input unit 26 inputs, into the base band processor 17, the SIP information acquired from the group call processor 24 and the message generator 25.
(Configuration of the Sip Server)

Figure 5:
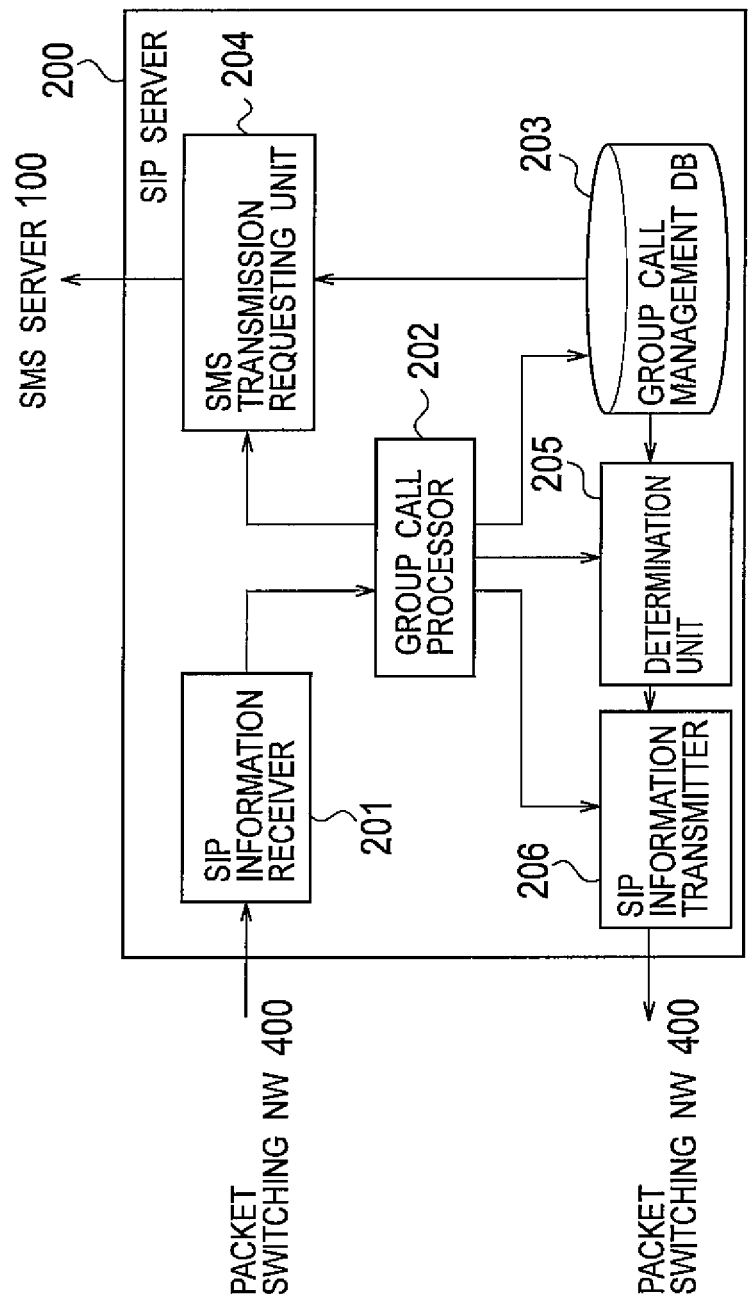
FIG. 5 is a block diagram showing a configuration of an SIP server according to the first embodiment of the present invention.

Hereinafter, a configuration of the SIP server according to a first embodiment of the present invention will be described with reference to the drawing. FIG. 5 is a block diagram showing the configuration of the SIP server 200 according to the first embodiment of the present invention.

As shown in FIG. 5, the SIP server 200 has an SIP information receiver 201, a group call processor 202, a group call management DB 203, an SMS transmission requesting unit 204, a determination unit 205, and an SIP information transmitter 206.

The SIP information receiver 201 receives the SIP information from the mobile station 10 through the packet switching NW 400.

The group call processor 202 performs processing concerning the group call in accordance with the SIP (Session Initiation Protocol).

For example, when the SIP information receiver 201 receives an INVITE (new), the group call processor 202 stores, in the group call management DB 203, the mobile station identification information that identifies each mobile station 10 included in the initial specified mobile station list.

When the SIP information receiver 201 receives the INVITE (new), the group call processor 202 generates an SMS transmission request that requests transmission of the SMS information that requests address registration in the SIP server 200, and inputs the generated SMS transmission request into the SMS transmission requesting unit 204. The SMS transmission request includes the mobile station identification information that identifies each mobile station 10 included in the initial specified mobile station list.

When the SIP information receiver 201 receives SIP information (200OK) indicating the mobile station 10's participation in the group call, the group call processor 202 updates the information stored in the group call management DB 203. Subsequently, the group call processor 202 generates SIP information (INFO (notice of participant)) indicating the mobile station 10 participating in the group call, and inputs the generated SIP information into the SIP information transmitter 206. The group call processor 202 generates an SMS transmission request that requests to transmit an SMS (notice of participant) to a non-participating mobile station, the SMS (notice of participant) including the mobile station identification information that identifies the mobile station 10 that participates in the group call. Then, the group call processor 202 inputs the generated SMS transmission request into the SMS transmission requesting unit 204. As mentioned above, the non-participating mobile station is a mobile station having the received call history (participation condition) of "not responded" or "disconnected."

When the SIP information receiver 201 receives SIP information (200OK) indicating the mobile station 10's halfway participation in the group call, the group call processor 202 updates the information stored in the group call management DB 203. Subsequently, the group call processor 202 generates SIP information (INFO (notice of updated participant)) indicating update of the mobile stations 10 that participate in the group call, and inputs the generated SIP information into the SIP information transmitter 206. The group call processor 202 generates an SMS transmission request that requests to transmit an SMS (notice of updated participant) to a non-participating mobile station, the SMS (notice of updated participant) including the mobile station identification information that identifies the mobile station 10 that participates in the group call halfway. Then, the group call processor 202 inputs the generated SMS transmission request into the SMS transmission requesting unit 204.

When the SIP information receiver 201 receives SIP information (BYE) indicating a mobile station 10's withdrawal from the group call, the group call processor 202 updates the information stored in the group call management DB 203. Subsequently, the group call processor 202 generates SIP information (INFO (notice of updated participant)) indicating update of the mobile stations 10 that participate in the group call, and inputs the generated SIP information into the SIP information transmitter 206. The group call processor 202 generates an SMS transmission request that requests to transmit to a non-participating mobile station an SMS (notice of participant withdrawal) indicating the mobile station 10's withdrawal from the group call. Then, the group call processor 202 inputs the generated SMS transmission request into the SMS transmission requesting unit 204.

When the SIP information receiver 201 receives SIP information that requests to participate in the group call halfway, i.e., an INVITE (halfway participation), the group call processor 202 inputs the mobile station identification information included in the INVITE (halfway participation) into the determination unit 205.

The group call management DB 203 stores information shown in FIG. 6 as management information for managing the mobile station 10 that performs the group call. FIGS. 6(a) to 6(d) are drawings showing the management information stored in the group call management DB 203 according to the first embodiment of the present invention.

As shown in FIGS. 6(a) to 6(d), in the management information, the participating member history, the initial specified mobile station list, the participation condition, and the call state are corresponded to each other.

The participating member history is formed of the initial specified mobile stations and the mobile station 10 that participates in the group call halfway. The participating member history also includes the mobile station 10 that has already withdrawn from the group call, and the mobile station 10 that does not respond although specified as the specified mobile station. As shown in FIGS. 6(a) to 6(d), a mobile station 10 is added to the participating member history as the mobile station 10 participates in the group call halfway.

While in the participating member history column includes the information of names of mobile stations 10 in FIGS. 6(a) to 6(d), apparently, the information may be the mobile station identification information that identifies each of the mobile stations 10 (for example, telephone number).

The initial specified mobile station list is the information that shows whether or not the mobile station 10 stored in the participating member history is the initial specified mobile station ("○" or "x"). The mobile station identification information that identifies the initial specified mobile station may be stored in the initial specified mobile station list column. The information for identifying the originating mobile station (for example, "originating mobile station") is also stored in the initial specified mobile station list column.

The participation condition is the information that shows whether or not the mobile station 10 is participating in the group call. When the mobile station 10 is participating in the group call, "calling" is stored as the participating information. When the mobile station 10 withdraws from the group call, "disconnected" stored as the participating information. When the mobile station 10 has not responded, "not responded" is stored as the participating information.

The call state is the information that shows whether or not the group call is continuing. When the group call is continuing, "calling" is stored as the call state. When the group call is completed, "disconnected" is stored as the call state.

The SMS transmission requesting unit 204 transmits to the SMS server 100 the SMS transmission request acquired from the group call processor 202.

The determination unit 205 determinates whether or not to accept halfway participation of the mobile station 10 that has transmitted the SIP information that requests to participate in the group call halfway, i.e., the INVITE (halfway participation).

Specifically, the determination unit 205 determinates whether or not the group call specified by the mobile station identification information acquired from the group call processor 202, i.e., the mobile station identification information on the mobile station 10 that participates in the group call, is continuing. The determination unit 205 accepts halfway participation of the mobile station 10 when the specified group call is continuing, and does not accept halfway participation of the mobile station 10 when the specified group call is completed.

The SIP information transmitter 206 transmits the SIP information acquired from the group call processor 202 (INVITE (new), INVITE (halfway participation), 100Trying, 180Ringing, 200OK, BYE, ANSWER, INFO, etc.) to the mobile station 10 through the packet switching NW 400.

(Configuration of SMS Server)

Figure 7:
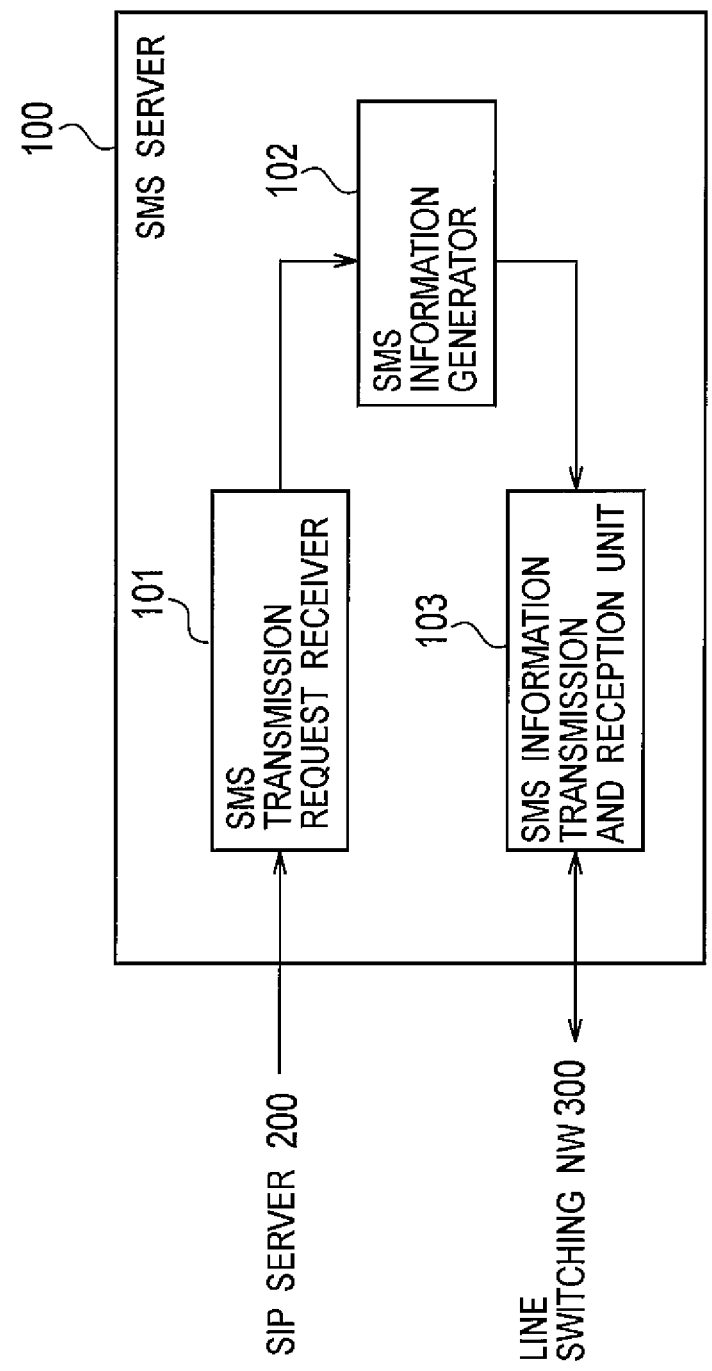
FIG. 7 is a block diagram showing a configuration of an SMS server according to the first embodiment of the present invention.

Hereinafter, a configuration of the SMS server according to the first embodiment of the present invention will be described with reference to the drawing. FIG. 7 is a block diagram showing the configuration of the SMS server 100 according to the first embodiment of the present invention.

As shown in FIG. 7, the SMS server 100 has an SMS transmission request receiver 101, an SMS information generator 102, and an SMS information transmission and reception unit 103.

The SMS transmission request receiver 101 receives from the SIP server 200 the SMS transmission request that requests transmission of the above-mentioned address registration request (SMS (registration request)), SMS (notice of participant), SMS (notice of updated participant), and SMS (notice of participant withdrawal).

The SMS information generator 102 generates SMS information to be transmitted to each mobile station 10 in response to the SMS transmission request received by the SMS transmission request receiver 101. Specifically, the SMS information generator 102 generates the address registration request (SMS (registration request)), the SMS (notice of participant), the SMS (notice of updated participant), and the SMS (notice of participant withdrawal) mentioned above.

Here, the address registration request (SMS (registration request)) includes the mobile station identification information that identifies each mobile station 10 included in the initial group. The SMS (notice of participant) includes the mobile station identification information that identifies the mobile station 10 that participates in the group call. The SMS (notice of updated participant) includes the mobile station identification information that identifies the mobile station 10 that participates in the group call halfway. The SMS (notice of participant withdrawal) shows that the mobile station 10 withdraws from the group call, and for example, includes the mobile station identification information that identifies the mobile station 10 that withdraws from the group call.

Here, the SMS (notice of participant), the SMS (notice of updated participant), and the SMS (notice of participant withdrawal) include group identification information such as time when the group call starts, the mobile station identification information that identifies the originating mobile station, the initial specified mobile station list, etc.

As shown in the third embodiment described later, the SMS information generator 102 may generate the SMS information (SMS (notice of application change)) indicating that an application used by the group call is changed. As shown in the fourth embodiment described later, the SMS information generator 102 may generate the SMS information (SMS (notice of participation prohibition)) indicating that halfway participation in the group call is prohibited.

The SMS information transmission and reception unit 103 transmits the SMS information generated by the SMS information generator 102 to the mobile station 10 through the line switching NW 300. For example, the SMS information transmission and reception unit 103 transmits the address registration request (SMS (registration request)) generated by the SMS information generator 102, through the line switching NW 300 to a specified mobile station included in the initial group. The SMS information transmission and reception unit 103 transmits to a non-participating mobile station the SMS (notice of participant), the SMS (notice of updated participant), and the SMS (notice of participant withdrawal) generated by the SMS information generator 102.

(Operation of Communication System)

Hereinafter, operation of the communication system according to the first embodiment of the present invention will be described with reference to the drawings. FIGS. 8 to 15 are sequence diagrams showing the operation of the communication system according to the first embodiment of the present invention.

First, the operation for the start of a group call will be described with reference to FIGS. 8 to 10. In this group call, an initial group is assumed to be a group including the originating mobile station and a mobile station 10 that responds a call from the originating mobile station among the specified mobile stations specified by the originating mobile station.

In the first embodiment, as mentioned above, the mobile station 10a is the originating mobile station, and the mobile station 10b to the mobile station 10d are the specified mobile stations specified by the mobile station 10a.

Figure 8:
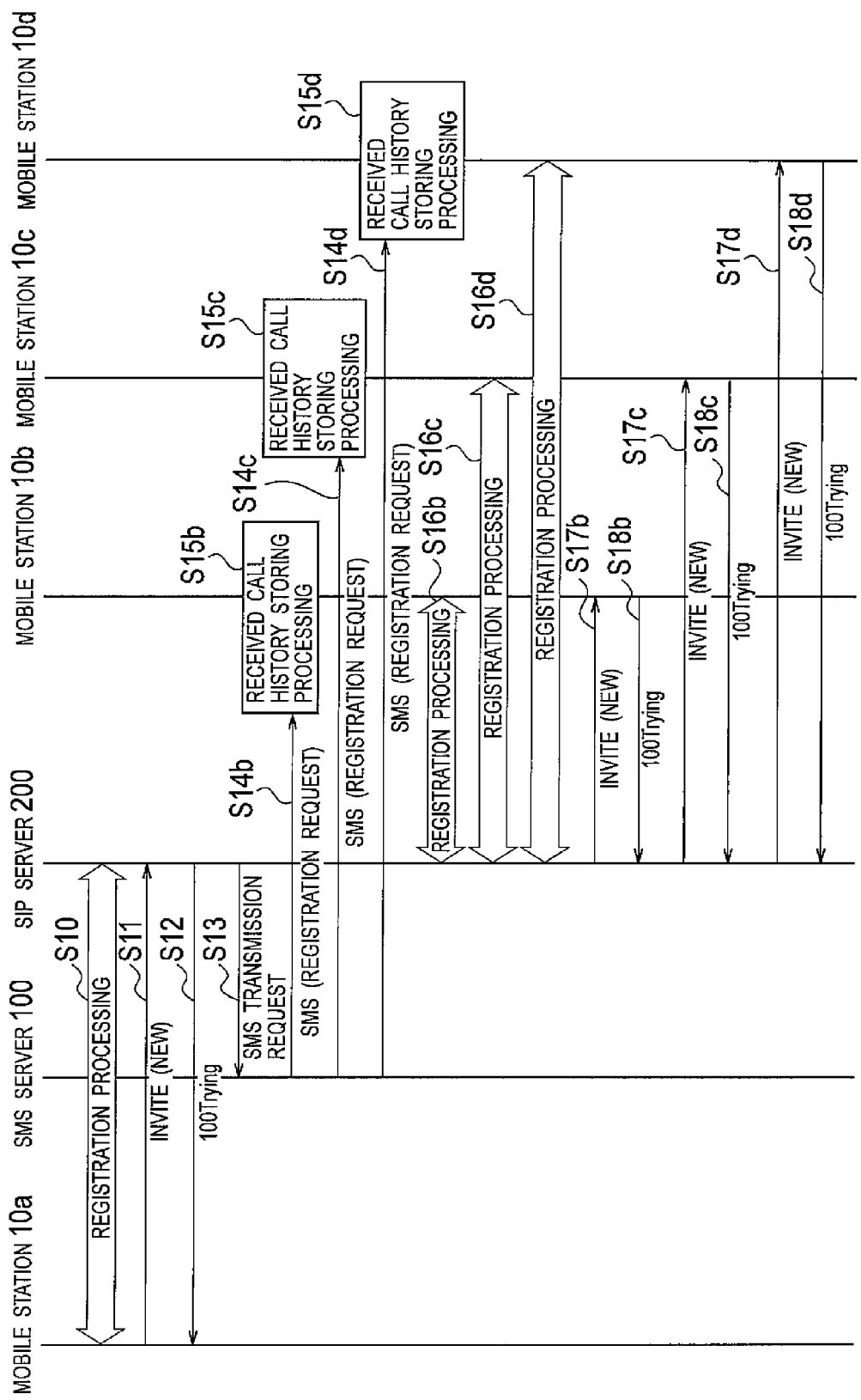
FIG. 8 is a sequence diagram showing operation of the communication system according to first embodiment of the present invention (1).

As shown in FIG. 8, at Step 10, the mobile station 10a logs in to the SIP server 200 connected to the packet switching NW 400. Specifically, the mobile station 10a performs processing to register the address of the mobile station 10a in the SIP server 200 (address registration).

At Step 11, the mobile station 10a transmits an INVITE (new) to the SIP server 200 to start a new group call. Here, the INVITE (new) is the SIP information that requests start of the new group call, and includes the mobile station identification information that identifies each of the mobile station 10b to the mobile station 10d (for example, telephone number), as well as the mobile station identification information that identifies the mobile station 10a.

At Step 12, in response to the INVITE (new), the SIP server 200 transmits a provisional response (100Trying) indicating start of processing to call the mobile stations 10b to 10d to the mobile station 10a.

At Step 13, the SIP server 200 transmits to the SMS server 100 an SMS transmission request requesting transmission of the address registration request (SMS (registration request)) that requests address registration in the SIP server 200. Here, the SMS transmission request includes the mobile station identification information that identifies each of the mobile stations 10a to 10d.

At Step 14b to Step 14d, the SMS server 100 transmits an address registration request (SMS (registration request)) through the line switching NW 300 to the mobile stations 10b to 10d, the address registration request (SMS (registration request)) requesting address registration in the SIP server 200. Here, the SMS (registration request) includes the mobile station identification information that identifies each of the mobile stations 10a to 10d.

At Step 15b to Step 15d, the mobile stations 10b to 10d store the mobile station identification information included in the SMS (registration request) as the received call history (participating member history and initial specified mobile station list).

At Step 16b to Step 16d, the mobile stations 10b to 10d log in to the SIP server 200 connected to the packet switching NW 400. Specifically, the mobile stations 10b to 10d perform registration processing to register the address of the mobile stations 10b to 10d in the SIP server 200.

At Step 17b to Step 17d, in order to call the mobile stations 10b to 10d, in response to the INVITE (new) received from the mobile station 10a, the SIP server 200 transmits the INVITE (new) to the mobile stations 10b to 10d through the packet switching NW 400.

At Step 18b to Step 18d, the mobile stations 10b to 10d transmit a provisional response (100Trying) indicating reception of the INVITE (new) to the SIP server 200.

Figure 9:
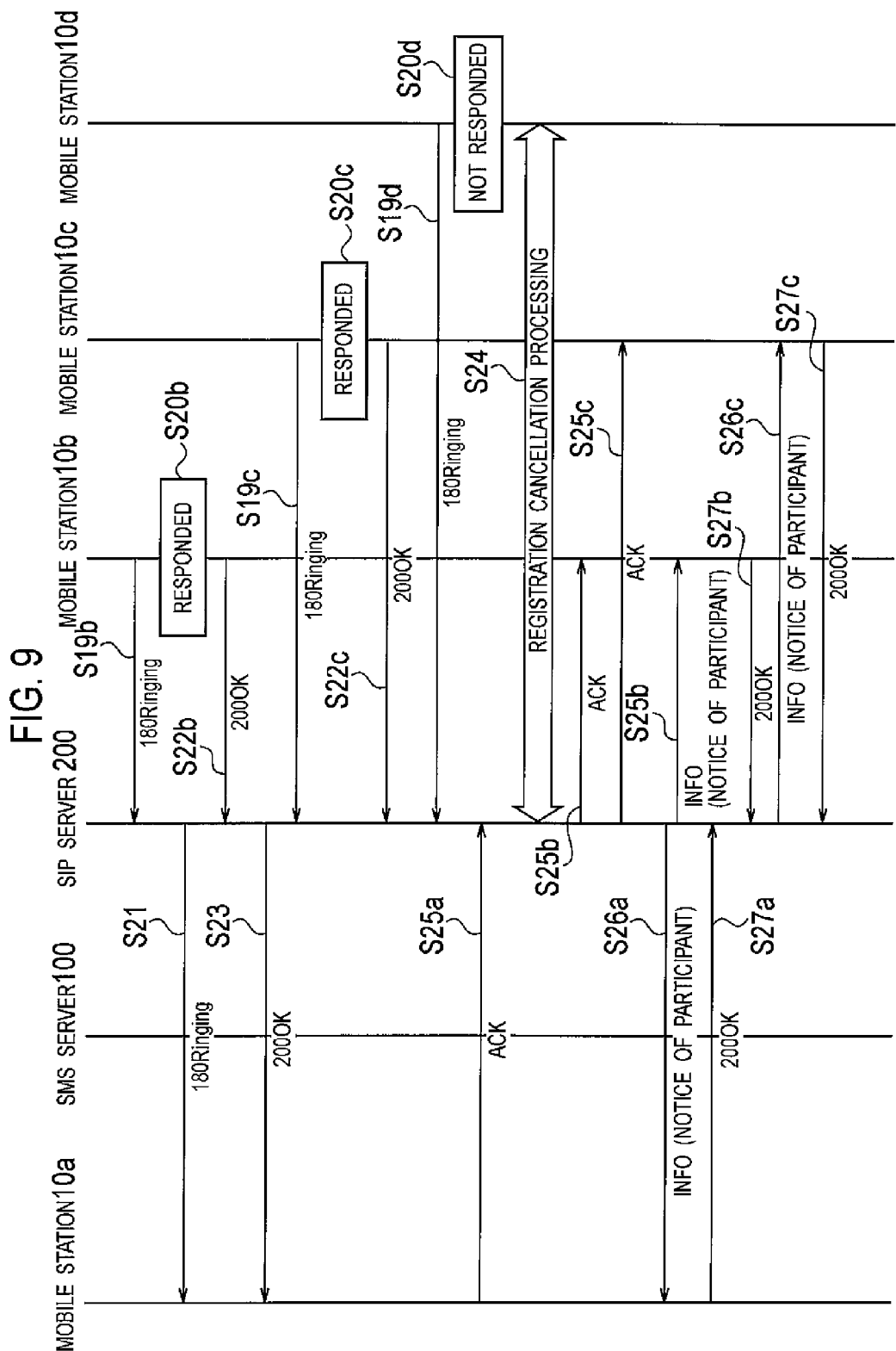
FIG. 9 is a sequence diagram showing the operation of the communication system according to the first embodiment of the present invention (2).

Subsequently, as shown in FIG. 9, at Step 19b to Step 19d, the mobile stations 10b to 10d transmit a provisional response (180ringing) indicating received call processing in progress to the SIP server 200 in response to the INVITE (new).

At Step 20b to Step 20c, the mobile station 10b and the mobile station 10c respond the INVITE (new). Specifically, users of the mobile station 10b and the mobile station 10c notice a call from the mobile station 10a, and perform responding processing to press down the responding key, etc. On the other hand, the mobile station 10d does not respond the INVITE (new) at Step 20d. Specifically, a user of the mobile station 10d does not perform responding processing to press down the responding key, etc., in response to the call from the mobile station 10a.

At Step 21, the SIP server 200 transmits a provisional response (180ringing) to the mobile station 10a, the provisional response (180ringing) indicating that the SIP server 200 is calling the mobile stations 10b to 10d.

At Step 22b and Step 22c, the mobile station 10b and the mobile station 10c transmit to the SIP server 200 a successful response (200OK) indicating that the mobile station 10b and the mobile station 10c have responded the INVITE (new).

At Step 23, the SIP server 200 transmits to the mobile station 10a a successful response (200OK) indicating that either of the mobile stations 10b to 10d has responded the INVITE (new).

At Step 24, the mobile station 10d performs address cancellation processing to cancel address registration in the SIP server 200.

At Step 25a, the mobile station 10a transmits to the SIP server 200 an ACK for confirming that it is possible to start a new group call. Similarly, at Step 25b and Step 25c, the SIP server 200 transmits to the mobile station 10b and the mobile station 10c an ACK for confirming that it is possible to start the new group call.

At Step 26a to Step 26c, the SIP server 200 transmits, to the mobile station 10a to the mobile station 10c, INFO (notice of participant) including the mobile station identification information (for example, telephone number and SIP address) that identifies the mobile station 10 that participates in the new group call.

At Step 27a to Step 27c, the mobile station 10a to the mobile station 10c transmit to the SIP server 200 a successful response (200OK) indicating reception of the INFO (notice of participant)

Figure 10:
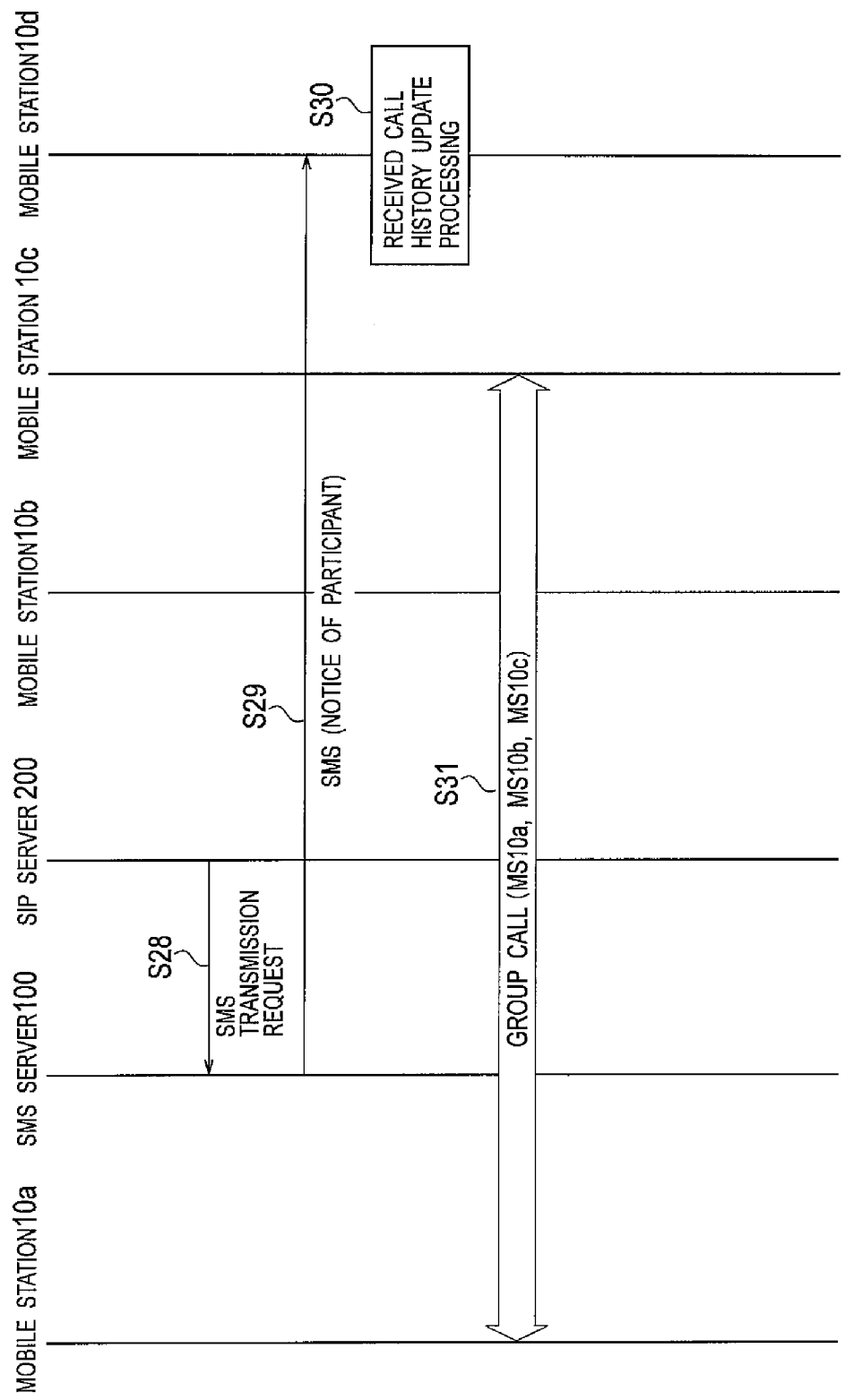
FIG. 10 is a sequence diagram showing the operation of the communication system according to the first embodiment of the present invention (3).

Subsequently, as shown in FIG. 10, at Step 28, the SIP server 200 transmits to the SMS server 100 an SMS transmission request requesting transmission of an SMS (notice of participant) including the mobile station identification information that identifies the mobile station 10 that participates in the group call.

At Step 29, the SMS server 100 transmits to the mobile station 10d the SMS (notice of participant) including the mobile station identification information that identifies the mobile station 10 that participates in the group call. In the present embodiment, the SMS (notice of participant) includes the mobile station identification information that identifies each of the mobile station 10a to the mobile station 10c.

At Step 30, the mobile station 10d updates the received call history (participation condition) corresponding to the mobile station identification information included in the SMS (notice of participant) received at Step 29.

At Step 31, the mobile station 10a to the mobile station 10c start a group call (MS10a, MS10b, MS10c) among the participating members of the mobile station 10a to the mobile station 10c.

Figure 11:
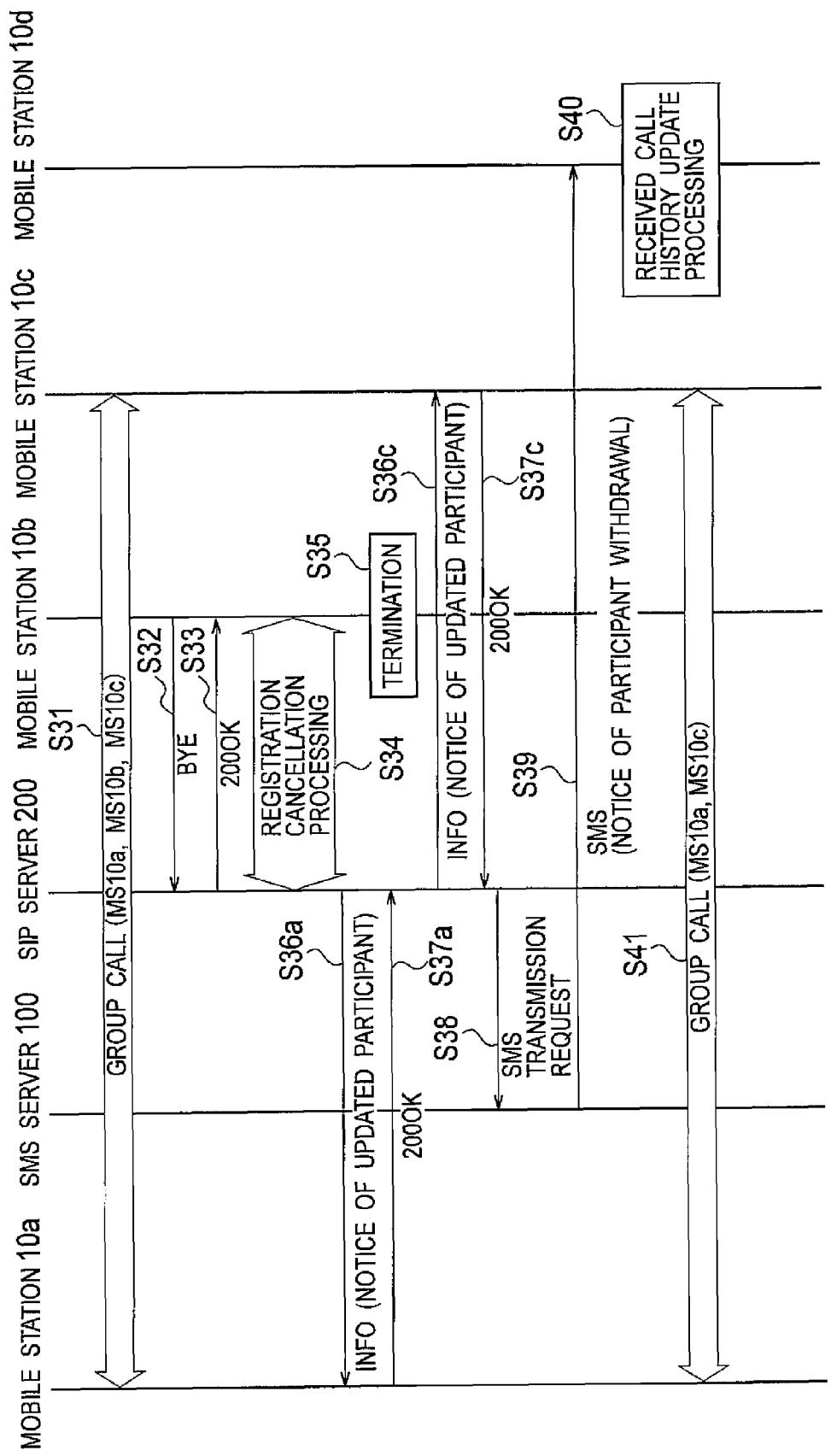
FIG. 11 is a sequence diagram showing the operation of the communication system according to the first embodiment of the present invention (4).

Next, operation when the mobile station 10b withdraws from the group call among the participating members of the mobile station 10a to the mobile station 10c will be described with reference to FIG. 11. FIG. 11 is a diagram showing processing subsequent to Step 31 shown in FIG. 10.

As shown in FIG. 10, at Step 31, the group call (MS10a, MS10b, MS10c) among the participating members of the mobile station 10a to the mobile station 10c is continuing.

At Step 32, the mobile station 10b transmits a withdrawal request (BYE) that requests withdrawal from the group call to the SIP server 200.

At Step 33, the SIP server 200 transmits a successful response (200OK) indicating reception of the withdrawal request (BYE) to the mobile station lob.

At Step 34, the mobile station 10b performs address cancellation processing to cancel address registration in the SIP server 200.

At Step 35, the mobile station 10b terminates an application used for the group call and the like, and ends the group call.

At Step 36a and Step 36c, the SIP server 200 transmits, to the mobile station 10a and the mobile station 10c, INFO (notice of updated participant) indicating update of the mobile stations 10 that participate in the group call. The INFO (notice of updated participant) is information indicating withdrawal of the mobile station 10b from the group call, etc.

At Step 37a and Step 37c, the mobile station 10a and the mobile station 10c transmit to the SIP server 200 a successful response (200OK) indicating reception of the INFO (notice of updated participant).

At Step 38, the SIP server 200 transmits to the SMS server 100 an SMS transmission request that requests transmission of the SMS (notice of participant withdrawal) indicating withdrawal of a mobile station 10 from the group call.

At Step 39, the SMS server 100 transmits to the mobile station 10d the SMS (notice of participant withdrawal) indicating withdrawal of the mobile station 10 from the group call. Here, the SMS (notice of participant withdrawal) is information indicating withdrawal of the mobile station 10b from the group call, and includes, for example, the mobile station identification information that identifies the mobile station 10b.

At Step 40, the mobile station 10d updates the received call history (participation condition) stored in the memory 19 on the basis of the SMS (notice of participant withdrawal) received at Step 39. Specifically, the mobile station 10d updates the received call history (participation condition) corresponding to the mobile station identification information that identifies the mobile station 10b from "calling" to "disconnected."

At Step 41, the mobile station 10a and the mobile station 10c continue the group call (MS10a, MS10c) between the participating members of the mobile station 10a and the mobile station 10c.

Figure 12:
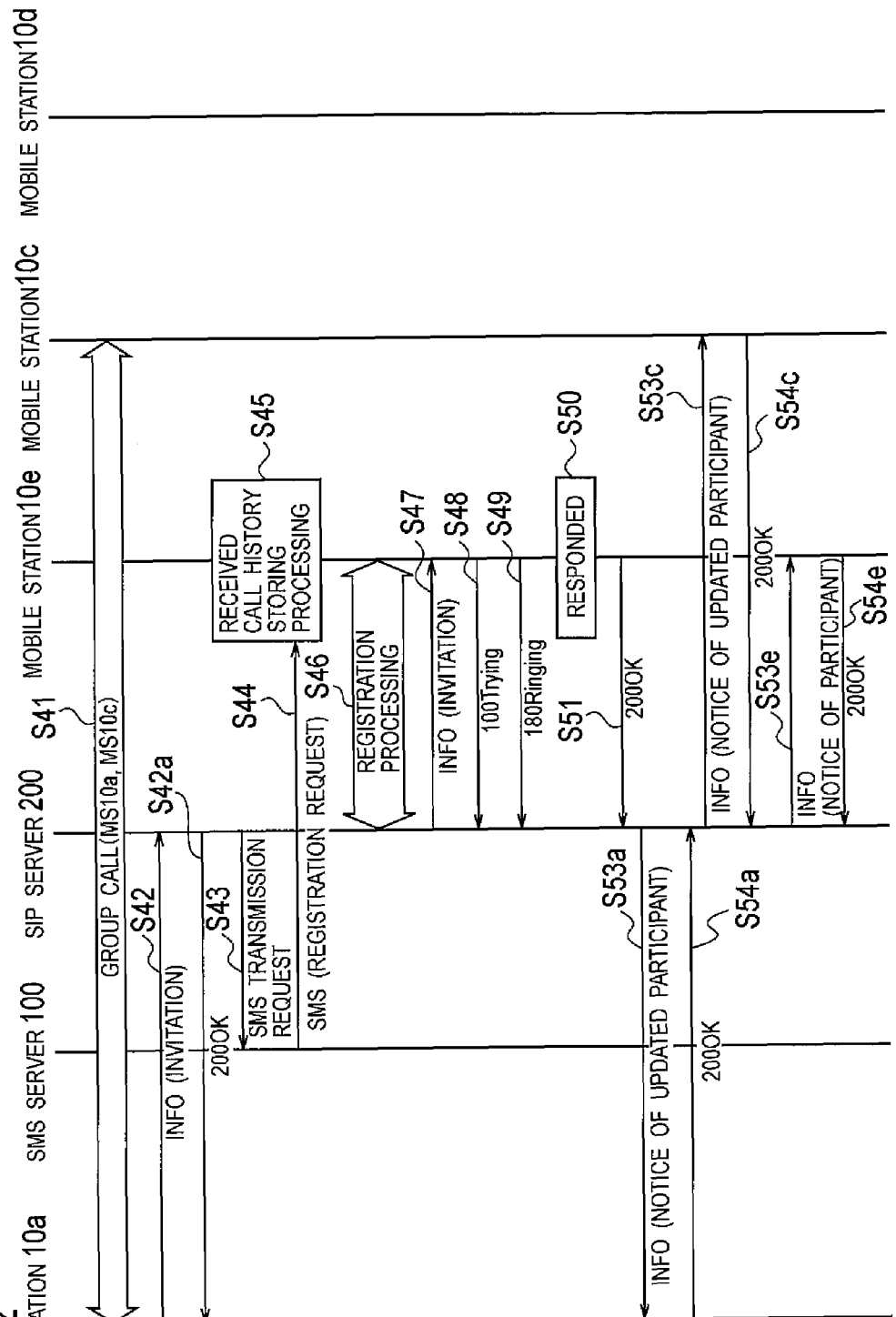
FIG. 12 is a sequence diagram showing the operation of the communication system according to the first embodiment of the present invention (5).
Figure 13:
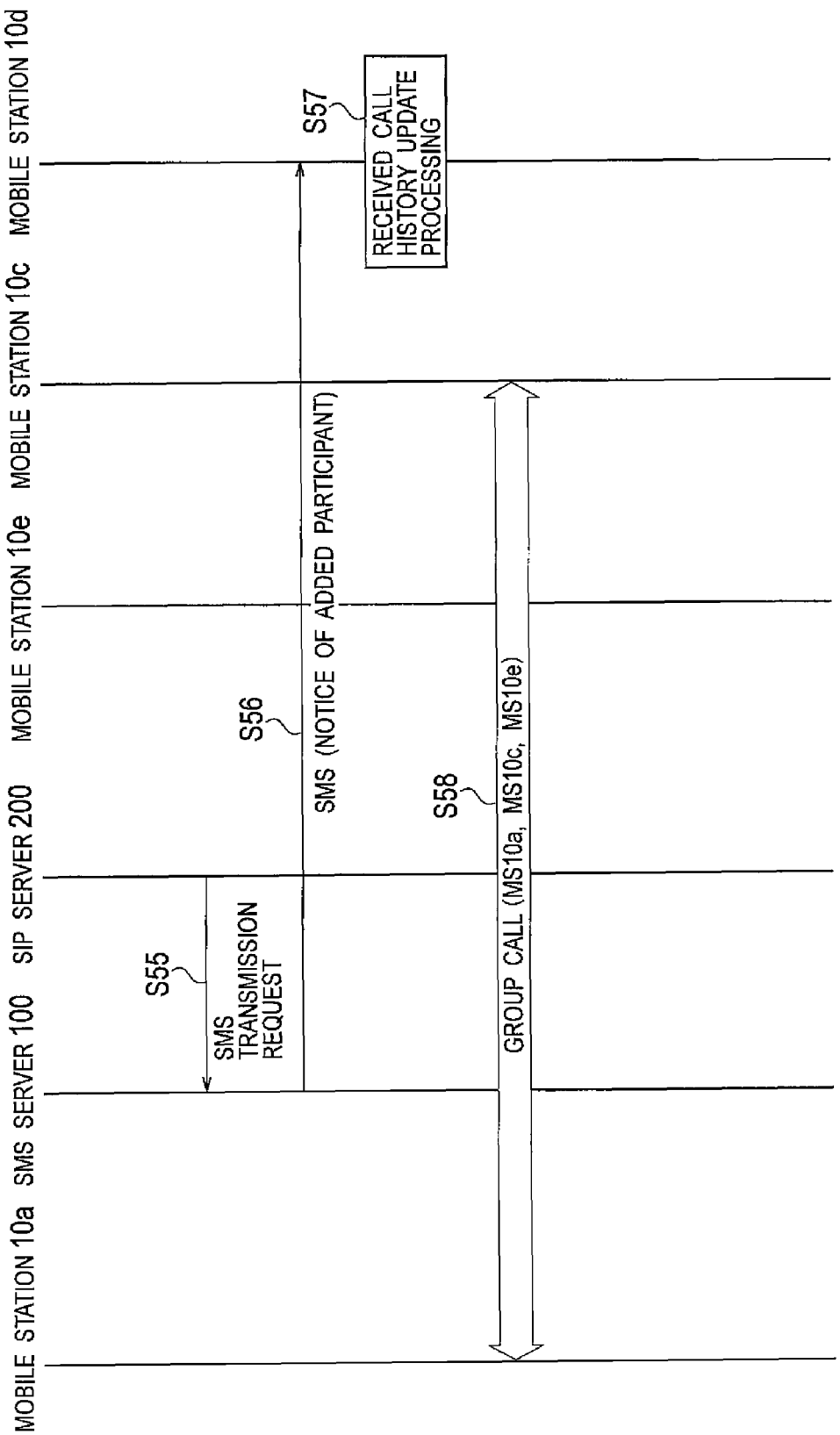
FIG. 13 is a sequence diagram showing the operation of the communication system according to the first embodiment of the present invention (6).

Next, FIGS. 12 and 13 will describe operation in the case where the mobile station 10a invites a mobile station 10e to participate halfway in the group call between the participating members of the mobile station 10a and the mobile station 10c. FIG. 12 is a diagram showing processing subsequent to Step 41 shown in FIG. 11.

As shown in FIG. 12, at Step 41, the group call (MS10a, MS10c) between the participating members of the mobile station 10a and the mobile station 10c is continuing.

At Step 42, the mobile station 10a transmits SIP information (INFO (invitation)) for inviting the mobile station 10e to the group call, through the packet switching NW 400 to the SIP server 200. Here, the INFO (invitation) includes the mobile station identification information that identifies the mobile station 10e (for example, telephone number).

At Step 42a, the SIP server 200 transmits to the mobile station 10a a successful reception (200OK) indicating reception of the SIP information (INFO (invitation)) that invites the mobile station 10e to the group call.

At Step 43, the SIP server 200 transmits to the SMS server 100 the SMS transmission request requesting transmission of the address registration request (SMS (registration request)) that requests address registration in the SIP server 200. Here, the is SMS transmission request includes the mobile station identification information that identifies the mobile station 10a, the mobile station 10c, and the mobile station 10e. The SMS transmission request may include the mobile station identification information that identifies each mobile station 10 (mobile station 10a to mobile station 10d) included in the initial specified mobile station list.

At Step 44, the SMS server 100 transmits the address registration request (SMS (registration request)) that requests address registration in the SIP server 200, through the line switching NW 300 to the mobile station 10e. Here, the SMS (registration request) includes the mobile station identification information that identifies the mobile station 10a, the mobile station 10c, and the mobile station 10e. The SMS (registration request) may include the mobile station identification information that identifies each mobile station 10 (mobile station 10a to mobile station 10d) included in the initial specified mobile station list.

At Step 45, the mobile station 10e stores the mobile station identification information included in the SMS (registration request) as a received call history.

At Step 46, the mobile station 10e logs in to the SIP server 200 connected to the packet switching NW 400. Specifically, the mobile station 10e performs registration processing to register the address of the mobile station 10e in the SIP server 200.

At Step 47, the SIP server 200 transmits INFO (invitation) to the mobile station 10e to call the mobile station 10e in response to the SIP information (INFO (invitation)) received from the mobile station 10a.

At Step 48, the mobile station 10e transmits to the SIP server 200 a provisional response (100Trying) indicating reception of the INFO (invitation).

At Step 49, in response to the INFO (invitation), the mobile station 10e transmits to the SIP server 200 a provisional response (180Ringing) indicating received call processing in progress.

At Step 50, the mobile station 10e responds the INFO (invitation). Specifically, a user of the mobile station 10e notices a call from the mobile station 10a, and performs responding processing to press down the responding key, etc.

At Step 51, the mobile station 10e transmits to the SIP server 200 a successful response (200OK) indicating that the mobile station 10e has responded the INFO (invitation).

At Step 53a and Step 53c, the SIP server 200 transmits, to the mobile station 10a and the mobile station 10c, INFO (notice of updated participant) indicating update of the mobile stations 10 that participate in the group call. The INFO (notice of updated participant) is information indicating the mobile station 10e's halfway participation in the group call (mobile station identification information that identifies mobile station 10e (telephone number and SIP address)), etc.

At Step 54a and Step 54c, the mobile station 10a and the mobile station 10c transmit to the SIP server 200 a successful response (200OK) indicating reception of the INFO (notice of updated participant).

At Step 53e, the SIP server 200 transmits, to the mobile station 10e, INFO (notice of participant) including the mobile station identification information (for example, the telephone number and the SIP address) that identifies each mobile station 10 that participates in the group call.

At Step 54e, the mobile station 10e transmits to the SIP server 200 a successful response (200OK) indicating reception of the INFO (notice of participant).

Subsequently, as shown in FIG. 13, at Step 55, the SIP server 200 transmits to the SMS server 100 an SMS transmission request requesting transmission of an SMS (notice of updated participant) including the mobile station identification information that identifies a mobile station 10 that participates in the group call halfway.

At Step 56, the SMS server 100 transmits to the mobile station 10d the SMS (notice of updated participant) including the mobile station identification information that identifies the mobile station 10 that participates in the group call halfway. Here, the SMS (notice of updated participant) is information indicating the mobile station 10e's halfway participation in the group call, and includes, for example, the mobile station identification information that identifies the mobile station 10e.

At Step 57, the mobile station 10d adds the mobile station identification information included in the SMS (notice of updated participant) received at Step 56 to the received call history (participating member history) stored in the memory 19. Specifically, the mobile station 10d adds the mobile station identification information that identifies the mobile station 10e to the received call history (participating member history), and simultaneously, updates the received call history (participation condition) to "calling," call history (participation condition) corresponding to the mobile station identification information that identifies the mobile station 10e.

At Step 58, the mobile station 10a, the mobile station 10c, and the mobile station 10e start a group call (MS10a, MS10c, MS10e) among the participating members of the mobile station 10a, the mobile station 10c, and the mobile station 10e.

Figure 14:
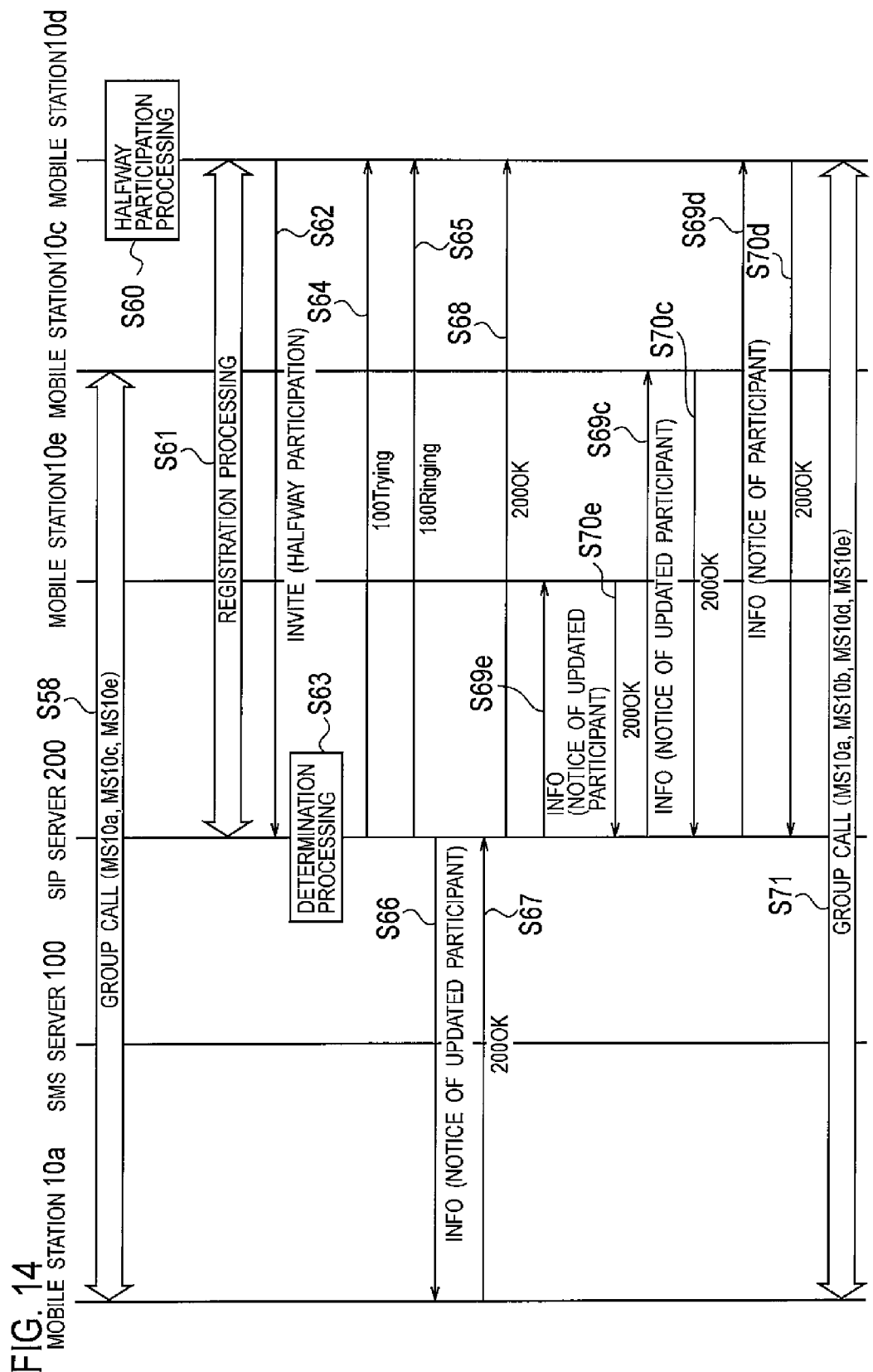
FIG. 14 is a sequence diagram showing the operation of the communication system according to the first embodiment of the present invention (7).

Next, FIG. 14 will describe operation in the case where the mobile station 10d included in the initial specified mobile station list can participate halfway in the group call (MS10a, MS10c, and MS10e) among the participating members of the mobile station 10a, the mobile station 10c, and the mobile station 10e. FIG. 14 is a diagram showing processing subsequent to Step 58 shown in FIG. 13.

As shown in FIG. 14, at Step 58, the group call among the participating members of the mobile station 10a, the mobile station 10c, and the mobile station 10e is continuing.

At Step 60, the mobile station 10d performs halfway participation processing to participate in the group call halfway. Specifically, a user of the mobile station 10d selects a desired group call out of the received call history stored in the memory 19, and performs processing to press down the calling key, etc.

At Step 61, the mobile station 10d logs in to the SIP server 200 connected to the packet switching NW 400. Specifically, the mobile station 10d performs processing to register the address of the mobile station 10d in the SIP server 200 (registration processing).

At Step 62, the mobile station 10d transmits an INVITE (halfway participation) to the SIP server 200 through the packet switching NW 400, the INVITE (halfway participation) requesting to participate in the desired group call selected at the step 60. Here, the INVITE (halfway participation) includes the mobile station identification information that identifies the mobile station 10 that participates in the desired group call (mobile station 10a, mobile station 10c, and mobile station 10e). The mobile station identification information that identifies the mobile station 10 that participates in the desired group call is the mobile station identification information having the received call history (participation condition) of "calling" stored in the memory 19 as mentioned above.

At Step 63, the SIP server 200 determinates whether or not halfway participation in the group call corresponding to the mobile station identification information included in the INVITE (halfway participation) is possible. Specifically, the SIP server 200 determinates that the mobile station 10d can participate halfway when the group call corresponding to the mobile station identification information is continuing. On the other hand, the SIP server 200 determinates that the mobile station 10d cannot participate halfway when the group call corresponding to the mobile station identification information is completed. In FIG. 14, since the group call among the participating members of the mobile station 10a, the mobile station 10c, and the mobile station 10e is continuing, the SIP server 200 determinates that the mobile station 10d can participate halfway.

At Step 64, in response to the INVITE (halfway participation), the SIP server 200 transmits to the mobile station 10d a provisional response (100Trying) indicating start of halfway participation processing for the mobile station 10d.

At Step 65, the SIP server 200 transmits to the mobile station 10d a provisional response (180Ringing) indicating calling of the mobile station 10a.

At Step 66, the SIP server 200 transmits, to the mobile station 10a, INFO (notice of updated participant) indicating update of the mobile stations 10 that participate in the group call. The INFO (notice of updated participant) is information indicating halfway participation in the group call of the mobile station 10d (mobile station identification information that identifies the mobile station 10d), etc.

At Step 67, the mobile station 10a transmits to the SIP server 200 a successful response (200OK) indicating reception of the INFO (notice of updated participant).

At Step 68, the SIP server 200 transmits to the mobile station 10d a successful response (200OK) indicating acceptance of halfway participation of the mobile station 10d.

At Step 69c and Step 69e, the SIP server 200 transmits INFO (notice of updated participant) indicating update of the mobile stations 10 that participate in the group call, to the mobile station 10c and the mobile station 10e. At Step 69d, the SIP server 200 transmits to the mobile station 10d the INFO (notice of participant) including the mobile station identification information that identifies each mobile station 10 that participates in the group call (for example, telephone number and SIP address).

At Step 70c and Step 70e, the mobile station 10c and the mobile station 10e transmit to the SIP server 200 a successful response (200OK) indicating reception of the INFO (notice of updated participant). Furthermore, at Step 70d, the mobile station 10d transmits to the SIP server 200 a successful response (200OK) indicating reception of the INFO (notice of participant).

Figure 15:
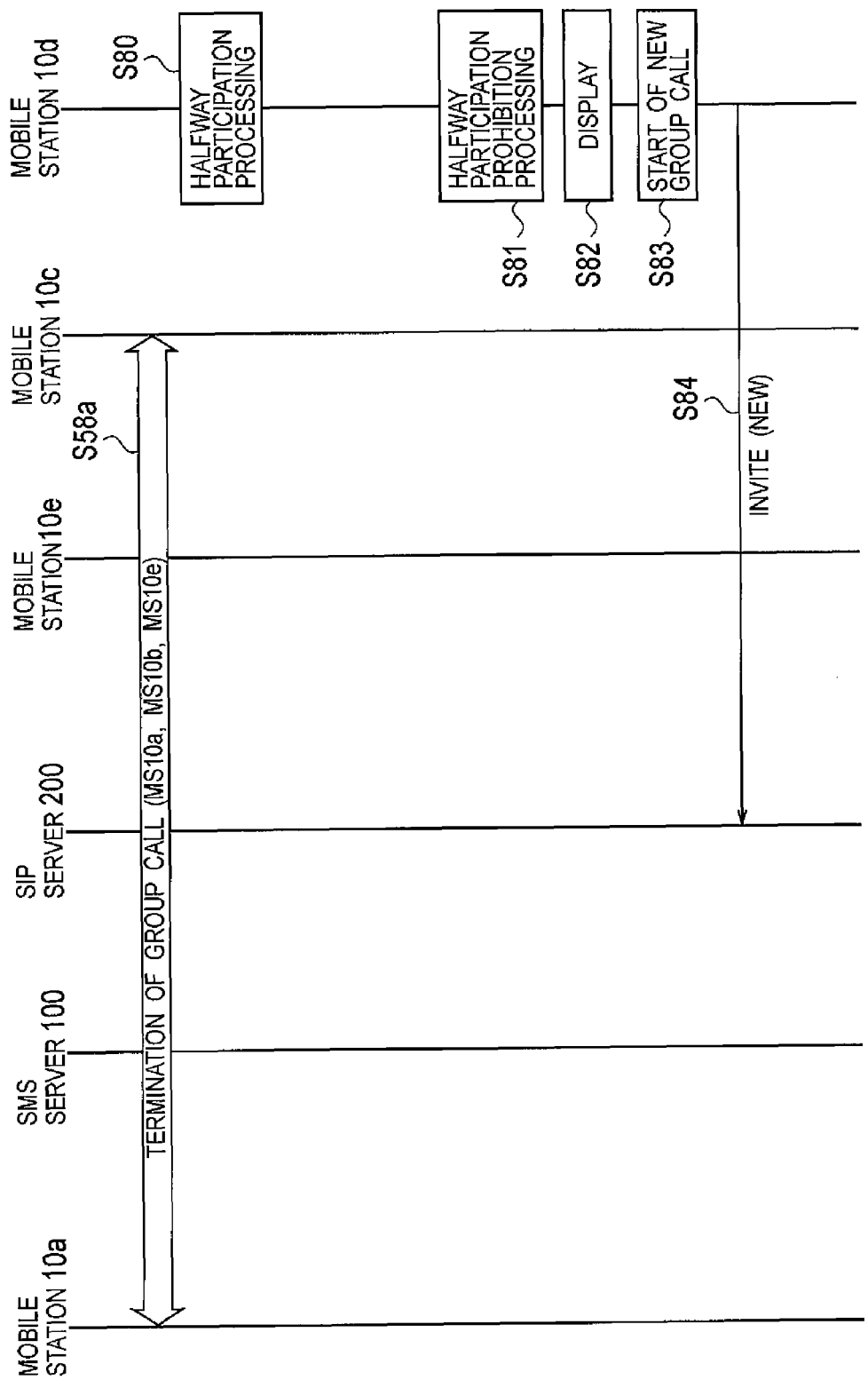
FIG. 15 is a sequence diagram showing the operation of the communication system according to the first embodiment of the present invention (8).

At Step 71, the mobile station 10a, the mobile station 10c, the mobile station 10d, and the mobile station 10e start a group call among the participating members of the mobile station 10a, the mobile station 10c, the mobile station 10d, and the mobile station 10e Finally, FIG. 15 describes operation in the case where the mobile station 10d included in the initial specified mobile station list cannot halfway participate in a group call (MS10a, MS10c, MS10e) among the participating members of the mobile station 10a, the mobile station 10c, and the mobile station 10e. FIG. 15 is a diagram showing processing subsequent to Step 58 shown in FIG. 13.

As shown in FIG. 15, at Step 58a, the group call (MS10a, MS10c, MS10e) among the participating members of the mobile station 10a, the mobile station 10c, and the mobile station 10e is completed.

At Step 80, in the same manner as at Step 60, the mobile station 10d performs halfway participation processing in order to participate in the group call halfway. Specifically, the user of the mobile station 10d selects a desired group call out of the received call history stored in the memory 19, and performs processing to press down the calling key, etc.

At Step 81, since the group call (MS10a, MS10c, and MS10e) among participating members of the mobile station 10a, the mobile station 10c, and the mobile station 10e is completed, the mobile station 10d performs halfway participation prohibition processing to prohibit halfway participation in the desired group call selected at Step 80. Specifically, the mobile station 10d updates to the inhibit flag corresponding to the desired group call to "1 (invalid)."

With reference to the received call history (participation condition) stored in the memory 19, the mobile station 10d determinates that the desired group call is completed when no mobile station 10 that participates in the desired group call exists.

At Step 82, the mobile station 10d displays information indicating that the mobile station 10d cannot participate halfway. Specifically, the mobile station 10d displays information such as "Group call is completed. Start a new group call?"

Thus, the mobile station 10d can also provide information on a display so that the user of the mobile station 10d can select whether or not to start a new group call, by specifying the mobile stations 10 that were performing the group call in which the mobile station 10d has been prohibited from participating halfway. In FIG. 15, a case where the user of the mobile station 10d selects to start a new group call will be further described.

At Step 83, the mobile station 10d starts a new group call among the mobile stations 10 that were performing the desired group call selected at Step 80 as the initial specified mobile station. Specifically, the user of the mobile station 10d specifies the mobile stations 10 as the originating mobile station out of the received call history (participating member history) stored in the memory 19, and performs processing to press down the calling key, etc.

At Step 84, the mobile station 10d transmits an INVITE (new) to the SIP server 200 through the packet switching NW 400 in order to start the new group call. Here, the INVITE (new) is SIP information that requests start of the new group call, and includes the mobile station identification information that identifies each mobile station 10 specified at Step 83, as well as the mobile station identification information that identifies of the mobile station 10d (for example, telephone number)

Since processing to start a new group call is the same as the processing shown in FIG. 8, description of processing after Step 84 will be omitted.

(Effects and Advantages)

According to the first embodiment of the present invention when participating in a group call halfway, the mobile station 10 transmits to the SIP server 200 an INVITE (halfway participation) including the mobile station identification information that identifies a mobile station 10 that participates in a desired group call.

Here, the mobile station 10 cannot simultaneously participate in a plurality of group calls. Therefore, even when a plurality of group calls that have started with the same initial specified mobile station list specified are continuing, the desired group call is specified by the mobile station identification information that identifies the mobile station 10 that participates in the group call.

In other words, even when a plurality of group calls have started with the same initial specified mobile station list specified are continuing, the mobile station 10 can specify the desired group call by the mobile station identification information that identifies the mobile station 10 that participates in the desired group call. Accordingly, the mobile station 10 can easily participate in the desired group call halfway by oneself without invitation from the mobile station 10 that participates in the desired group call.

Particularly, since the mobile station 10 can easily participate in the desired group call halfway even when the user does not notice a call (INVITE (new)) from the originating mobile station, convenience for a user improves.

According to the first embodiment of the present invention, the mobile station 10 acquires the mobile station identification information that identifies the mobile station 10 that participates in the group call using the SMS information (SMS (notice of participant), SMS (notice of updated participant), SMS (notice of participant withdrawal) received from the SMS server 100 through the line switching NW 300.

Accordingly, even in the case where the mobile station 10 is not located within a sector managed by the base station 40 included in the packet switching NW 400, when the mobile station 10 is located within a sector managed by the base station 30 included in the line switching NW 300, the mobile station 10 can acquire the mobile station identification information that identifies the mobile station 10 that participates in the group call. That is, a possibility of acquiring the mobile station identification information that identifies the mobile station 10 that participates in the group call can be improved, compared with the case where the mobile station identification information that identifies the mobile station 10 that participates in the group call is acquired through the packet switching NW 400.

As a result, the mobile station 10 can participate in a desired group call halfway immediately when the mobile station 10 is located within the sector managed by the base station 40 included in the packet switching NW 400, and convenience for the user improves.

Furthermore, according to the first embodiment of the present invention, the mobile station 10 prohibits halfway participation in the desired group call when the desired group call is completed.

Accordingly, useless transmission of an INVITE (halfway participation) for halfway participation in the group call already ended can be prevented, and effective use of network resource can be attained.

Furthermore, according to the first embodiment of the present invention, when halfway participation in the desired group a call is prohibited, the mobile station 10 provides information on a display so that the user of the mobile station 10*d* can select whether or not to start a new group call by specifying the mobile stations 10 that were performing the group call.

Accordingly, even when the desired group call is completed, the user can specify the mobile stations 10 that were performing the desired group call to easily start a new group call, and convenience for the user improves.

Second Embodiment

Hereinafter, a second embodiment of the present invention will be described with reference to the drawings. Differences between the first embodiment mentioned above and the second embodiment will be mainly described below.

Specifically, in the first embodiment mentioned above, since the mobile station 10*d* does not respond the call from the mobile station 10*a*, the mobile station 10*d* does not participate in the group call. On the other hand, in the second embodiment, since the mobile station 10*d* cannot receive a call from the mobile station 10*a*, the mobile station 10*d* cannot participate in the group call.
(Operation of Communication System)

Figure 16:
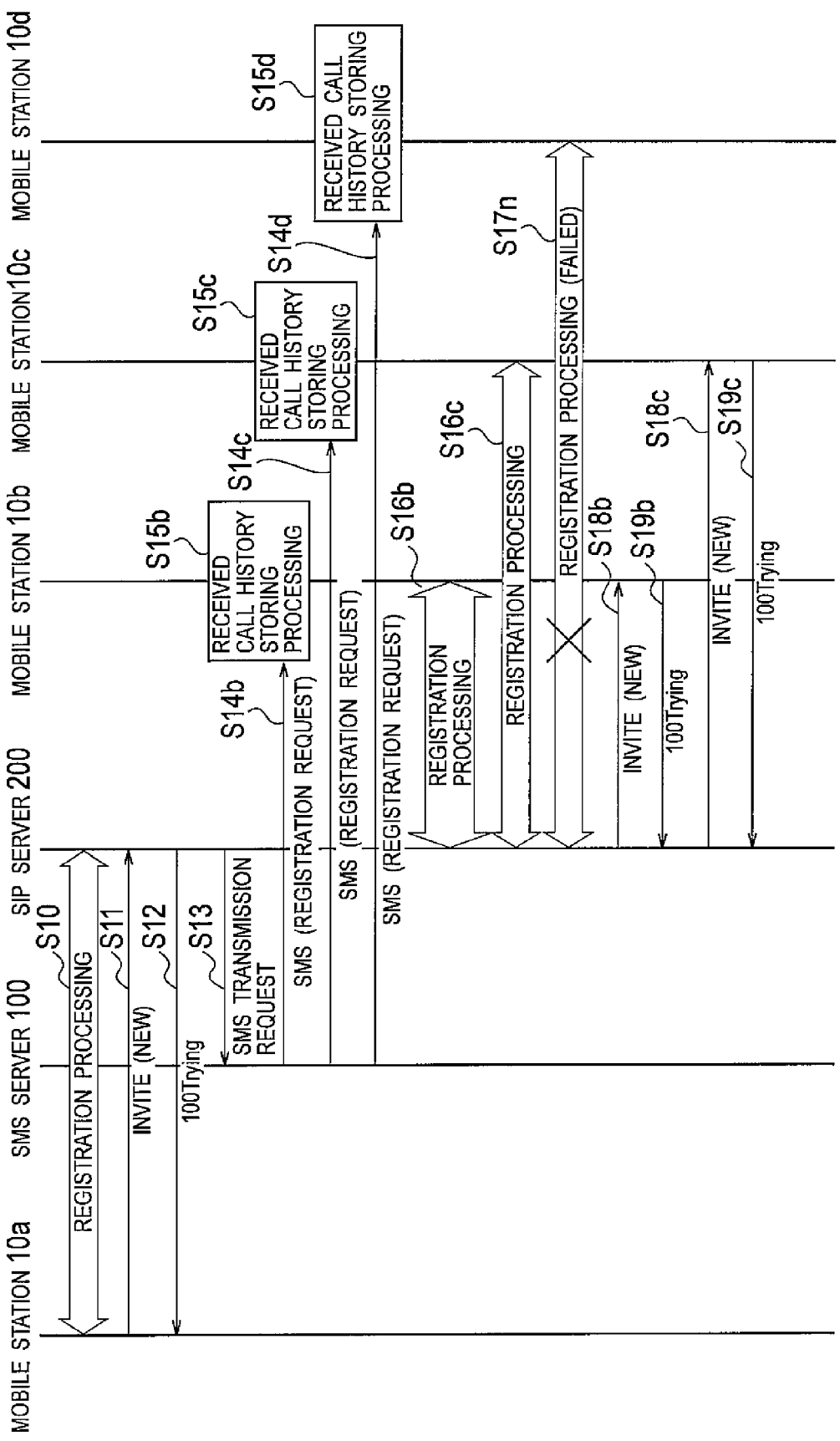
FIG. 16 is a sequence diagram showing operation of the communication system according to a second embodiment of the present invention.

Hereinafter, operation of a communication system according to the second embodiment of the present invention will be described with reference to the drawings. FIG. 16 is a sequence diagram indicating the operation of the communication system according to the second embodiment of the present invention. In FIG. 16, same step numbers are given to the same processings as those shown in FIG. 8. Accordingly, description of the same processings as in FIG. 8 will be omitted below.

As shown in FIG. 16, at Step 17*n*, although the mobile station 10*d* performs registration processing to register the address of the mobile station 10*d* in the SIP server 200 connected to the packet switching NW 400, the registration processing fails. For example, when the mobile station 10*d* is not located within a sector managed by the base station 40 included in the packet switching NW 400, the mobile station 10*d* fails in the registration processing.

Third Embodiment

Hereinafter, a third embodiment of the present invention will be described with reference to the drawings. Differences between the first embodiment mentioned above and the third embodiment will be mainly described below.

Specifically, in the first embodiment mentioned above, the application used for the group call is not particularly referred to. On the other hand, in the second embodiment, the application used for group call is changed from application 1 (application prior to change) into application 2 (application after change).
(Operation of Communication System)

Hereinafter, operation of a communication system according to the third embodiment of the present invention will be described with reference to the drawings. FIG. 17 is a sequence diagram showing the operation of the communication system according to the third embodiment of the present invention. FIG. 17 shows processing subsequent to Step 58 shown in FIG. 13.

As shown in the drawing 17, at Step 58, the group call among the participating members of the mobile station 10*a*, the mobile station 10*c*, and the mobile station 10*e* is continuing. In the group call, application 1 (for example, IP-TV) is used.

Here, the IP-TV is the group call application that allows transmission and reception of the voice signal and the image signal, as mentioned above.

At Step 100, the mobile station 13*a* transmits to the SIP server 200 the INFO (application change request) requesting to change the application used in the group call from application 1 into application 2 (for example, PTT (Push-To-Talk)).

Here, the PTT is the group call application that allows transmission and reception of only the voice signal, as mentioned above.

As a case where the application is changed, cases are assumed where received signal strength of the image signal becomes smaller than a predetermined threshold due to deterioration of a radio wave condition while performing the group call using the IP-TV, etc. In such a case, the application is changed to the PTT that uses the voice signal having a signal quantity smaller than that of the image signal.

As another case where the application is changed, cases are assumed where received signal strength of the voice signal becomes larger than a predetermined threshold due to improvement of a radio wave condition while performing the group call using the PTT, etc. In such a case, the application is changed to the IP-TV that uses the image signal having a larger signal quantity than that of the voice signal.

Apparently, the application used for the group call may be changed according to needs of the user.

At Step 101*c* and Step 101*e*, the SIP server 200 transmits the INFO (application change request) received from the mobile station 10*a* to the mobile station 10*c* and the mobile station 10*e*.

At Step 102*c* and Step 102*e*, the mobile station 10*c* and the mobile station 10*e* transmit to the SIP server 200 a successful response (200OK) indicating reception of the INFO (application change request).

At Step 103, the SIP server 200 transmits to the mobile station 10*a* a successful response (200OK) indicating that the mobile station 10*c* and the mobile station 10*e* have received the INFO (application change request).

At Step 104, the mobile station 10a transmits to the SIP server 200 a termination request (BYE) that requests termination of application 1.

At Step 105c and Step 105e, the SIP server 200 transmits the termination request (BYE) that requests termination of application 1, to the mobile station 10c and the mobile station 10e.

At Step 106c and Step 106e, the mobile station 10c and the mobile station 10e transmit to the SIP server 200 a successful response (200OK) indicating reception of the termination request (BYE).

At Step 107, the SIP server 200 transmits to the mobile station 10a a successful response (200OK) indicating that the mobile station 10c and the mobile station 10e have terminated application 1.

At Step 108, the SIP server 200 transmits to the SMS server 100 an SMS transmission request requesting transmission of an SMS information (SMS (notice of application change)) that informs that the application used in the group call has changed from application 1 into application 2.

At Step 109, the SMS server 100 transmits the SMS (notice of application change) to the mobile station 10d through the line switching NW 300, the SMS (notice of application change) informing that the application used in the group call has changed from application 1 into application 2. Here, the SMS (notice of application change) is the SMS information including application information to specify application 2.

At Step 110, the mobile station 10d updates a received call history stored in the memory 19. Specifically, the mobile station 10d updates the application used in the group call stored as a received call history from application 1 to application 2.

At Step 111, the mobile station 10a, the mobile station 10c, and the mobile station 10e perform setup processing of application 2.

At Step 112, the mobile station 10a, the mobile station 10c, and the mobile station 10e start a group call (MS10a, MS10c, MS10e) using application 2. The participating members of the group call are the mobile station 10a, the mobile station 10c, and the mobile station 10e similarly to the case at Step 58.

When participating in the group call halfway, the mobile station 10d selects the application used in the group call with reference to the received call history stored in the memory 19. Since processing for the mobile station 10d to participate in the group call halfway is the same as that of FIGS. 14 and 15 mentioned above, description of the processing will be omitted.

(Effects and Advantages)

According to the third embodiment of the present invention, the mobile station 10 receives, through the line switching NW 300, SMS information (SMS (notice of application change)) indicating that the application used in the group call in which the mobile station 10 does not participate has changed. That is, before the mobile station 10 transmits an INVITE (halfway participation) to the SIP server 200, the mobile station 10 receives the SMS information (SMS (notice of application change)), and updates the received call history on the basis of the received SMS (notice of application change).

Accordingly, when the mobile station 10 transmits the INVITE (halfway participation) to the SIP server 200, the mobile station 10 can request halfway participation in a group call with a suitable application. That is, refusal of halfway participation in the group call due to an attempt to participate in the group call halfway with an application different from the application used in the group call can be prevented.

Fourth Embodiment

Hereinafter, a fourth embodiment of the present invention will be described with reference to the drawing. Differences between the first embodiment mentioned above and the fourth embodiment will be mainly described below.

Specifically, in the first embodiment mentioned above, halfway participation of the mobile station 10d is not particularly prohibited by the mobile station 10a (originating mobile station). On the other hand, in the fourth embodiment, halfway participation of the mobile station 10d is prohibited by the mobile station 10a (originating mobile station).

(Operation of Communication System)

Hereinafter, operation of a communication system according to the fourth embodiment of the present invention will be described with reference to the drawing. FIG. 18 is a sequence diagram showing the operation of the communication system according to the fourth embodiment of the present invention. FIG. 18 shows processing subsequent to Step 58 shown in FIG. 13.

As shown in FIG. 18, at Step 58, the group call among the participating members of the mobile station 10a, the mobile station 10c, and the mobile station 10e is continuing.

At Step 120, the mobile station 10a transmits, to the SIP server 200, INFO (notice of participation prohibition) indicating prohibition of halfway participation of the mobile station 10d.

At Step 121, the SIP server 200 transmits to the mobile station 10a a successful response (200OK) indicating reception of the INFO (notice of participation prohibition).

At Step 122c and Step 122e, the SIP server 200 transmits to the mobile station 10c and the mobile station 10e the INFO (notice of participation prohibition) indicating prohibition of halfway participation of the mobile station 10d.

At Step 123c and Step 123e, the mobile station 10c and the mobile station 10e transmit to the SIP server 200 a successful response (200OK) indicating reception of the INFO (notice of participation prohibition).

At Step 124, the SIP server 200 transmits to the SMS server 100 the SMS transmission request requesting transmission of an SMS information (SMS (notice of participation prohibition)) indicating prohibition of halfway participation in the group call.

At Step 125, the SMS server 100 transmits the SMS (notice of participation prohibition) indicating prohibition of halfway participation in the group call, to the mobile station 10d through the line switching NW 300.

At Step 126, the mobile station 10d performs halfway participation processing in order to participate in the group call halfway. Specifically, the user of the mobile station 10d selects a desired group call out of the received call history stored in the memory 19, and performs processing to press down the calling key, etc.

At Step 127, the mobile station 10d displays information indicating that halfway participation in the desired group call is prohibited. For example, the mobile station 10d displays information such as "halfway participation in the group call is prohibited."

At Step 128, the mobile station 10d performs halfway participation prohibition processing to prohibit halfway participation in the desired group call selected at Step 126. Specifically, the mobile station 10d updates the inhibit flag corresponded with the desired group call to "1 (invalid)."

(Effects and Advantages)

According to the fourth embodiment of the present invention, the mobile station 10 receives through the line switching NW 300 the SMS information (SMS (notice of participation prohibition)) indicating prohibition of halfway participation in the group call. That is, the mobile station 10 receives the SMS information (SMS (notice of participation prohibition)) before receiving the INVITE (halfway participation).

Accordingly, useless transmission of the INVITE (halfway participation) in order to participate in the group call in which halfway participation is prohibited by another mobile station 10 can be prevented, and effective use of network resource can be attained.

Other Embodiments

While the present invention has been described with the above-mentioned embodiments, it is to be understood that the statements and drawings that make a part of this disclosure will not limit the present invention. From this disclosure, various alternative embodiments, examples, and technique for implementation will be apparent to persons skilled in the art.

For example, in description of the first embodiment mentioned above, the SMS server 100 and the SIP server 200 are different servers from each other, but not limited to this. Specifically, one network server connected to both the line switching NW 300 and the packet switching NW 400 may have function of the SMS server 100 and function of the SIP server 200.

In the first embodiment mentioned above, the servers provided in the communication system are the SMS server 100 and the SIP server 200, but not limited to this. Specifically, in addition to the SMS server 100 and the SIP server 200, the communication system may have a group call managing server that manages the group call. In this case, the group call management DB 203 provided in the SIP server 200 may be provided in the group call managing server.

Furthermore, in the fourth embodiment mentioned above, the mobile station 10a (originating mobile station) that requests start of the group call transmits the SIP information (INFO (notice of participation prohibition)) indicating prohibition of halfway participation in the group call, but not limited to this. Specifically, a different mobile station 10 that participates in the group call may transmit the SIP information (INFO (notice of participation prohibition)).

Whole contents of Japanese Patent Application No. 2006-124524 (filed Apr. 27, 2006) are incorporated herein by reference.

INDUSTRIAL APPLICABILITY

As mentioned above, the mobile phone terminal and the server according to the present invention allow easy halfway participation in a desired group call without invitation from a mobile station (mobile phone terminal) included in a the group that is performing a group call, and therefore, are useful in mobile communications.

The invention claimed is:

1. A server that manages a group call in which a phone call among a plurality of mobile phone terminals is performed, the server comprising:
a new calling information receiver configured to receive new calling information that requests start of the group call;
a management unit configured to manage halfway participation indicating that a mobile phone terminal not participating in the group call participates in the group call, and halfway withdrawal indicating that a mobile phone terminal participating in the group call withdraws from the group call; and
a transmitter configured to transmit a participating terminal change notification to a first mobile phone terminal that is specified as a calling destination of the group call and has not participated in the group call, when the management unit detects the halfway participation or the halfway withdrawal, the participating terminal change notification including: information indicating that the halfway participation or the halfway withdrawal has occurred; and terminal identification information identifying a second mobile phone terminal that participates halfway or withdraws halfway.

2. A mobile phone terminal connectable with a group call system that performs a group call in which a phone call among a plurality of mobile phone terminals is performed, the mobile phone terminal comprising:
a receiver configured to receive new received call information that includes group identification information identifying the group call and that requests participation to the group call;
a storage unit configured to store as a received call history the group call corresponding to the new received call information received by the receiver, while associating the group call with the group identification information included in the new received call information and terminal identification information identifying a first mobile phone terminal specified as a calling destination of the group call; and
a received call history updating unit configured to update the terminal identification information stored as the received call history on the basis of a participating terminal change notification when receiving the participating terminal change notification, wherein the mobile phone terminal receives the participating terminal change notification when the mobile phone terminal has not participated in the group call, the participating terminal change notification including: information indicating that halfway participation or halfway withdrawal has occurred, the halfway participation indicating that a mobile phone terminal not participating in the group call participates in the group call, the halfway withdrawal indicating that a mobile phone terminal participating in the group call withdraws from the group call; terminal identification information identifying a second mobile phone terminal that participates halfway or withdraws halfway; and the group identification information.

3. A system that manages a group call in which a phone call among a plurality of mobile phone terminals is performed, the system comprising:
a management unit configured to manage halfway participation indicating that a mobile phone terminal not participating in the group call participates in the group call, and halfway withdrawal indicating that a mobile phone terminal participating in the group call withdraws from the group call; and
a transmitter configured to transmit a participating terminal change notification to a first mobile phone terminal that is specified as a calling destination of the group call and has not participated in the group call, when the management unit detects the halfway participation or the halfway withdrawal, the participating terminal change notification including: information indicating that the halfway participation or the halfway withdrawal has occurred; and terminal identification information identifying a second mobile phone terminal that participates halfway or withdraws halfway.

* * * * *